US011865540B2

(12) United States Patent
Kornilovich et al.

(10) Patent No.: US 11,865,540 B2
(45) Date of Patent: Jan. 9, 2024

(54) MICROFLUIDIC DEVICE

(71) Applicant: Hewlett-Packard Development Company, L.P., Spring, TX (US)

(72) Inventors: Pavel Kornilovich, Corvallis, OR (US); Alexander N. Govyadinov, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 767 days.

(21) Appl. No.: 16/317,429

(22) PCT Filed: Sep. 23, 2016

(86) PCT No.: PCT/US2016/053488
§ 371 (c)(1),
(2) Date: Jan. 11, 2019

(87) PCT Pub. No.: WO2018/057005
PCT Pub. Date: Mar. 29, 2018

(65) Prior Publication Data
US 2019/0291102 A1 Sep. 26, 2019

(51) Int. Cl.
*G01N 33/68* (2006.01)
*G01N 21/33* (2006.01)
(Continued)

(52) U.S. Cl.
CPC ..... *B01L 3/50273* (2013.01); *B01L 3/502738* (2013.01); *B01L 3/502746* (2013.01);
(Continued)

(58) Field of Classification Search
CPC ......... B01L 3/50273; B01L 2300/0867; B01L 3/502738; B01L 3/502746;
(Continued)

(56) References Cited

U.S. PATENT DOCUMENTS 5,921,678 A 7/1999 Desai et al.
6,406,893 B1 8/2002 Knapp et al.
(Continued)

FOREIGN PATENT DOCUMENTS

CN 103003577 3/2013
EP 1645329 4/2006
(Continued)

OTHER PUBLICATIONS

Neils et al., Combinatorial mixing of microfluidic streams, The Royal Society of Chemistry, Lab Chip, vol. 4, pp. 342-350, 2004.
(Continued)

*Primary Examiner* — Jennifer Wecker
*Assistant Examiner* — Oyeleye Alexander Alabi
(74) *Attorney, Agent, or Firm* — Foley & Lardner LLP

(57) ABSTRACT

A microfluidic device may include at least four interconnected microfluidic channels and a set of fluid actuators. The set of fluid actuators may include a fluid actuator asymmetrically located within at least two of the at least four interconnected microfluidic channels. Each of the at least four interconnected microfluidic channels may be activated to a fluid inputting state, a fluid outputting state and a fluid blocking state in response to selective actuation of different combinations of fluid actuators of the set.

18 Claims, 12 Drawing Sheets

(51) Int. Cl.

| | |
|---|---|
| ***G01N 21/64*** | (2006.01) |
| ***G01N 33/52*** | (2006.01) |
| ***C07C 309/05*** | (2006.01) |
| ***C07C 309/73*** | (2006.01) |
| ***A01N 1/02*** | (2006.01) |
| ***G01N 1/40*** | (2006.01) |
| ***B01L 3/00*** | (2006.01) |

(52) U.S. Cl.

CPC .................. *B01L 2200/0605* (2013.01); *B01L 2200/0621* (2013.01); *B01L 2300/0861* (2013.01); *B01L 2300/0867* (2013.01); *B01L 2400/0433* (2013.01); *B01L 2400/0442* (2013.01)

(58) Field of Classification Search

CPC ..... B01L 2200/0605; B01L 2200/0621; B01L 2300/0861; B01L 2400/0433; B01L 2400/0442; B41J 2/14

See application file for complete search history.

(56) References Cited

U.S. PATENT DOCUMENTS

| | | | | |
|---|---|---|---|---|
| 6,857,449 | B1 | 2/2005 | Chow et al. | |
| 9,211,539 | B2 | 12/2015 | Amin et al. | |
| 2001/0030130 | A1 | 10/2001 | Ricco et al. | |
| 2002/0074271 | A1 | 6/2002 | Hu et al. | |
| 2003/0164296 | A1 | 9/2003 | Squires et al. | |
| 2004/0094418 | A1 | 5/2004 | Cox et al. | |
| 2005/0047967 | A1 | 3/2005 | Chuang et al. | |
| 2010/0197522 | A1 | 8/2010 | Liu et al. | |
| 2011/0286493 | A1 | 11/2011 | Torniainen et al. | |
| 2012/0244604 | A1* | 9/2012 | Kornilovich | B01L 3/50273 435/286.1 |
| 2013/0061962 | A1* | 3/2013 | Kornilovich | F17D 3/00 137/565.17 |
| 2014/0034132 | A1 | 2/2014 | Li et al. | |
| 2016/0114319 | A1 | 4/2016 | McGuinness et al. | |
| 2016/0121325 | A1* | 5/2016 | Masquelier | C12Q 1/6874 506/2 |
| 2016/0136643 | A1 | 5/2016 | Larson | |

FOREIGN PATENT DOCUMENTS

| | | | | |
|---|---|---|---|---|
| TW | 201536572 | | 10/2015 | |
| WO | WO-2014137940 | A1 * | 9/2014 | B01L 3/50273 |
| WO | 2016024998 | | 2/2016 | |
| WO | 2017146744 | | 8/2017 | |

OTHER PUBLICATIONS

International Search Report dated Jul. 6, 2017 for PCT/US2016/053488, Applicant Hewlett-Packard Development Company, L.P.

* cited by examiner

MICROFLUIDIC DEVICE

BACKGROUND

Microfabrication involves the formation of structures and various components on a substrate (e.g., silicon chip, ceramic chip, glass chip, etc.). Examples of microfabricated devices include microfluidic devices. Microfluidic devices include structures and components for conveying, processing, and/or analyzing fluids.

DETAILED DESCRIPTION OF EXAMPLES

Figure 1:
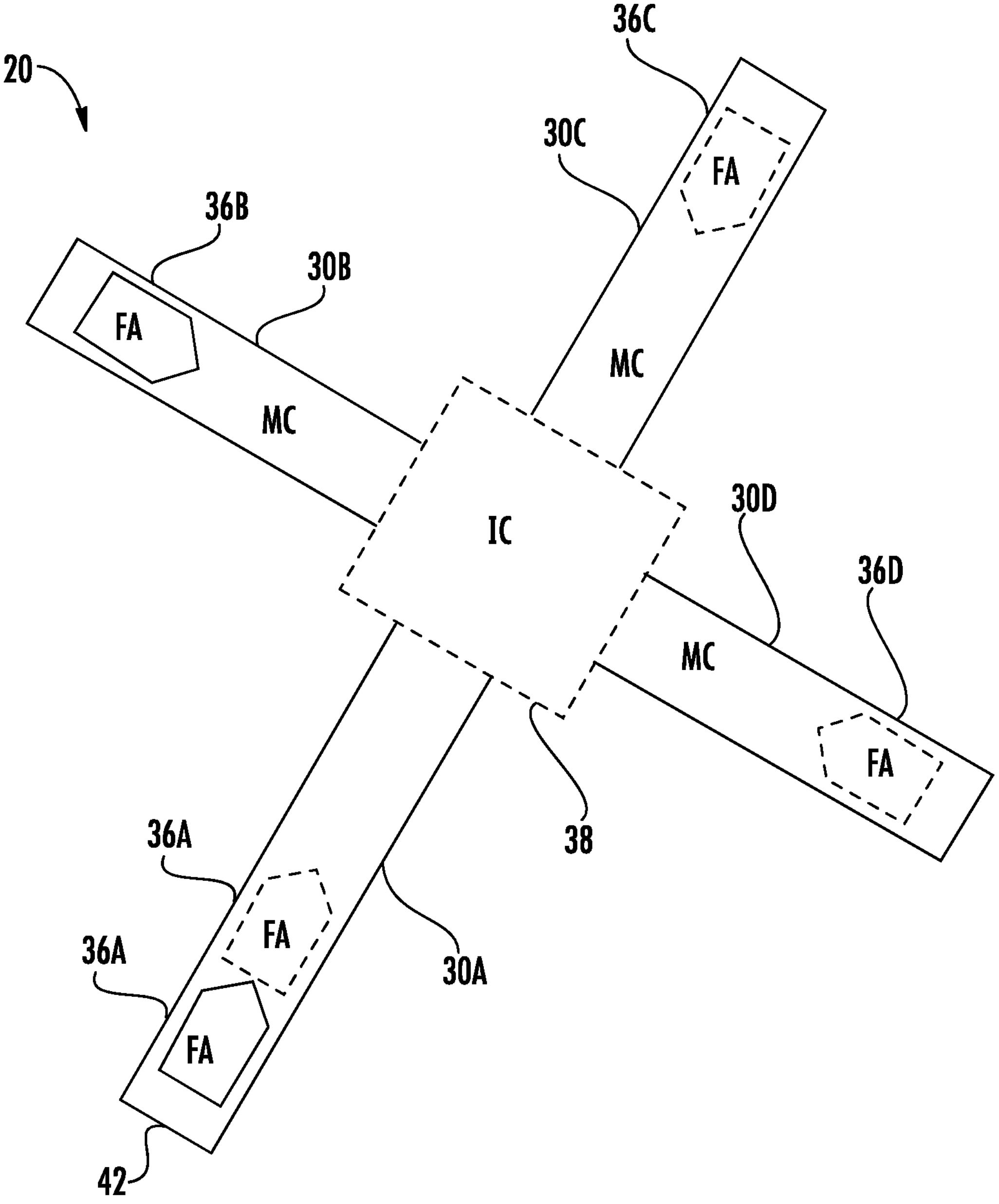
FIG. 1 is a schematic diagram of an example microfluidic device.

Examples provided herein include devices, methods, and processes for microfluidic devices. Some example microfluidic devices include lab-on-a-chip devices (e.g., polymerase chain reaction devices, chemical sensors, etc.), fluid ejection devices (e.g., inkjet printheads, fluid analysis devices, etc.), and/or other such microdevices having microfluidic structures and associated components. Examples described herein may comprise microfluidic channels and fluid actuators disposed therein, where the microfluidic channels may be fluidly coupled together, and the fluid actuators may be actuated to dispense, mix, sense or otherwise interact with nanoliter and picoliter scale volumes of various fluids.

Example devices may comprise at least four interconnected microfluidic channels and a set of fluid actuators with a fluid actuator asymmetrically located within each of the at least four interconnected microfluidic channels. Each of the at least four interconnected microfluidic channels may be activated to a fluid inputting state, a fluid outputting state and a fluid blocking state in response to or through selective actuation of different combinations of fluid actuators of the set.

As will be appreciated, examples provided herein may be formed by performing various microfabrication and/or micromachining processes on a substrate to form and/or connect structures and/or components. The substrate may comprise a silicon based wafer or other such similar materials used for microfabricated devices (e.g., glass, gallium arsenide, plastics, etc.). Examples may comprise microfluidic channels, fluid actuators, and/or volumetric chambers. Microfluidic channels and/or chambers may be formed by performing etching, microfabrication processes (e.g., photolithography), or micromachining processes in a substrate. Accordingly, microfluidic channels and/or chambers may be defined by surfaces fabricated in the substrate of a microfluidic device. In some implementations, microfluidic channels and/or chambers may be formed by an overall package, wherein multiple connected package components that combine to form or define the microfluidic channel and/or chamber.

In some examples described herein, at least one dimension of a microfluidic channel and/or capillary chamber may be of sufficiently small size (e.g., of nanometer sized scale, micrometer sized scale, millimeter sized scale, etc.) to facilitate pumping of small volumes of fluid (e.g., picoliter scale, nanoliter scale, microliter scale, milliliter scale, etc.). For example, some microfluidic channels may facilitate capillary pumping due to capillary force. In addition, examples may couple at least two microfluidic channels to a microfluidic output channel via a fluid junction. At least one fluid actuator may be disposed in each of the at least two microfluidic channels, and the fluid actuators may be selectively actuated to thereby pump fluid into the microfluidic output channel.

The microfluidic channels may facilitate conveyance of different fluids (e.g., liquids having different chemical compounds, different concentrations, etc.) to the microfluidic output channel. In some examples, fluids may have at least one different fluid characteristic, such as vapor pressure, temperature, viscosity, density, contact angle on channel walls, surface tension, and/or heat of vaporization. It will be appreciated that examples disclosed herein may facilitate manipulation of small volumes of liquids.

A fluid actuator, as used herein may correspond to an inertial pump. Fluid actuators that may be implemented as inertial pumps described herein may include, for example, thermal actuators, piezo-membrane based actuators, electrostatic membrane actuators, mechanical/impact driven membrane actuators, magnetostrictive drive actuators, electrochemical actuators, other such microdevices, or any combination thereof. In some examples, fluid actuators may be formed in microfluidic channels by performing various microfabrication processes.

In some examples, a fluid actuator may correspond to an inertial pump. As used herein, an inertial pump corresponds to a fluid actuator and related components disposed in an asymmetric position in a microfluidic channel, where an asymmetric position of the fluid actuator corresponds to the fluid actuator being positioned less distance from a first end of a microfluidic channel as compared to a distance to a second end of the microfluidic channel. Accordingly, in some examples, a fluid actuator of an inertial pump is not positioned at a mid-point of a microfluidic channel. The asymmetric positioning of the fluid actuator in the microfluidic channel facilitates an asymmetric response in fluid proximate the fluid actuator that results in fluid displacement when the fluid actuator is actuated. Repeated actuation of the fluid actuator causes a pulse-like flow of fluid through the microfluidic channel.

In some examples, an inertial pump includes a thermal actuator having a heating element (e.g., a thermal resistor) that may be heated to cause a bubble to form in a fluid proximate the heating element. In such examples, a surface of a heating element (having a surface area) may be proximate to a surface of a microfluidic channel in which the heating element is disposed such that fluid in the microfluidic channel may thermally interact with the heating element. In some examples, the heating element may comprise a thermal resistor with at least one passivation layer disposed on a heating surface such that fluid to be heated may contact a topmost surface of the at least one passivation layer. Formation and subsequent collapse of such bubble may generate circulation flow of the fluid. As will be appreciated, asymmetries of the expansion-collapse cycle for a bubble may generate such flow for fluid pumping, where such pumping may be referred to as "inertial pumping." In other examples, a fluid actuator corresponding to an inertial pump may comprise a membrane (such as a piezoelectric membrane) that may generate compressive and tensile fluid displacements to thereby cause fluid flow.

As will be appreciated, a fluid actuator may be connected to a controller, and electrical actuation of a fluid actuator (such as a fluid actuator of an inertial pump) by the controller may thereby control pumping of fluid. Actuation of a fluid actuator may be of relatively short duration. In some examples, the fluid actuator may be pulsed at a particular frequency for a particular duration. In some examples, actuation of the fluid actuator may be 1 microsecond (μs) or less. In some examples, actuation of the fluid actuator may be within a range of approximately 0.1 microsecond (μs) to approximately 10 milliseconds (ms). In some examples described herein, actuation of a fluid actuator comprises electrical actuation. In such examples, a controller may be electrically connected to a fluid actuator such that an electrical signal may be transmitted by the controller to the fluid actuator to thereby actuate the fluid actuator. Each fluid actuator of an example microfluidic device may be actuated according to actuation characteristics. Examples of actuation characteristics include, for example, frequency of actuation, duration of actuation, number of pulses per actuation, intensity or amplitude of actuation, phase offset of actuation. As will be appreciated in some examples, at least one actuation characteristic may be different for each fluid actuator. For example, a first fluid actuator may be actuated according to first actuation characteristics and a second fluid actuator may be actuated according to second actuation characteristics, where the actuation characteristics for a respective fluid actuator may be based at least in part on a desired concentration of a respective fluid in a fluid mixture, a fluid characteristic of the respective fluid, a fluid actuator characteristic, the length and cross-sectional area of a respective channel, and/or other such characteristics or input/output variables. For example, the first fluid actuator may be actuated a first number of times and the second fluid actuator may be actuated a second number of times such that a desired concentration of a first fluid and a desired concentration of a second fluid are present in a fluid mixture.

Turning now to the figures, and particularly to FIG. 1, this figure provides a diagram that illustrates some components of an example microfluidic device 20. In this example, the microfluidic device 20 comprises at least four interconnected microfluidic channels 30A, 30B, 30C, 30D (collectively referred to as microfluidic channel 30) and a set 34 of at least two individual fluid actuators individual fluid actuators 36A and 36B. As indicated by broken lines, in one implementation, set 34 may comprise additional individual fluid actuators 36. In one implementation, set 34 may comprise three individual fluid actuators, additionally comprising fluid actuator 36C. In yet another implementation, set 34 may additionally comprise fluid actuators 36C and 36D (fluid actuators 36A, 36B, 36C and 36D collectively referred to as fluid actuators 36), wherein each of the at least four microfluidic channels 30 contains at least one fluid actuator 36. Microfluidic channels 30 comprise fluid passages that facilitate conveyance of fluids.

As schematically represented by the fluid interconnection (IC) 38 shown in broken lines, microfluidic channels 30 are interconnected or fluidly coupled to one another such that fluid may be conveyed from one channel to another channel. For purposes of this disclosure, the term "fluidly coupled', with respect to a first volume and a second volume means that fluid may be conveyed from the first volume to the second volume directly or across at least one intermediate channel, passage or volume.

Microfluidic channels 30 may form a complex network of microfluidic channels through which fluid may be conveyed to and between various sources and endpoints. In one implementation, the fluid interconnection IC may comprise a direct connection, wherein at least some of microfluidic channels 30 are directly connected to one another. In another implementation, the fluid interconnection IC may be of an indirect nature, wherein at least some of microfluidic channels are connected indirectly to one another by an intermediate connecting channel or connection channels.

Although FIG. 1 schematically illustrates four symmetrically arranged microfluidic channels 30 in a single plane with two pairs a microfluidic channels extending directly opposite to one another, in other implementations, the at least four microfluidic channels 30 may have other arrangements. For example, in other implementations, microfluidic device 20 may comprise greater than four microfluidic channels 30. In other implementations, the at least four interconnected microfluidic channels may be interconnected to one another in non-symmetrical fashions, at different or unequal angles relative to one another. In other implementations, the at least four interconnected microfluidic channels may extend in multiple different orthogonal planes, such as in the X, Y and/or Z orthogonal planes. In some implementations, the at least four interconnected microfluidic channels may overlap or bridge one another.

Fluid actuators 36 each correspond to an inertial pump. Fluid actuators that may be implemented as inertial pumps described herein may include, for example, thermal actuators, piezo-membrane based actuators, electrostatic membrane actuators, mechanical/impact driven membrane actuators, magnetostrictive drive actuators, electrochemical actuators, other such microdevices, or any combination thereof. In some examples, fluid actuators may be formed in microfluidic channels by performing various microfabrication processes.

Each of fluid actuators 36 is asymmetrically positioned or located in a corresponding one of microfluidic channels 30, where an asymmetric position of the fluid actuator 36 corresponds to the fluid actuator 36 being positioned less distance from a first end of the corresponding microfluidic channel 30 as compared to a distance to a second end of the corresponding microfluidic channel 30. In such implementations, the fluid actuator 36 serving as an inertial pump is not positioned at a mid-point of the corresponding microfluidic channel 30. The asymmetric positioning of the fluid actuator 36 in the corresponding microfluidic channel 36 facilitates an asymmetric response in fluid proximate the fluid actuator that results in fluid displacement when the fluid actuator 36 is actuated. Repeated actuation of the fluid actuator 36 causes a pulse-like flow of fluid through the microfluidic channel 30. In the example illustrated, each fluid actuator 36 is schematically represented by a pointed object, the pointed object indicating that overall asymmetric response or direction of fluid flow with results from activation of the fluid actuator 36.

In some examples, each inertial pump 36 includes a thermal actuator having a heating element (e.g., a thermal resistor) that may be heated to cause a bubble to form in a fluid proximate the heating element. In such examples, a surface of a heating element (having a surface area) may be proximate to a surface of a microfluidic channel in which the heating element is disposed such that fluid in the microfluidic channel may thermally interact with the heating element. In some examples, the heating element may comprise a thermal resistor with at least one passivation layer disposed on a heating surface such that fluid to be heated may contact a topmost surface of the at least one passivation layer. Formation and subsequent collapse of such bubble may generate circulation flow of the fluid. As will be appreciated, asymmetries of the expansion-collapse cycle for a bubble may generate such flow for fluid pumping, where such pumping may be referred to as "inertial pumping." In other examples, each fluid actuator 36 serving as an inertial pump may comprise a membrane (such as a piezoelectric membrane) that may generate compressive and tensile fluid displacements to thereby cause fluid flow.

In the example illustrated, the number of interconnected microfluidic channels and the provision of a fluid actuator asymmetrically located within each of the interconnected microfluidic channels facilitates selective activation of each microfluidic channel to one of multiple available states. Through selective activation of different combinations of the fluid actuators 36, each microfluidic channel 30 may be in either a fluid inputting state which fluid is flowing in a direction towards fluid interconnection 38, a fluid outputting state in which fluid is flowing in a direction away from fluid interconnection 38 or a fluid blocking state in which fluid flow within the microfluidic channel does not exist, wherein the fluid existing within the channel may substantially block or impede the entry or flow of fluid from other microfluidic channels into the channel. As a result, microfluidic device 20 provides a complex network or microfluidic switchboard, wherein selective actuation of the fluid actuator 36 of microfluidic device 20 may be used to selectively direct different volumes of fluid from different sources, across different fluid interacting active devices (mixing, heating, sensing and the like) and/or to different destinations.

Although FIG. 1 illustrates each of fluid actuators 36 being located at similar relative asymmetric locations within their respective microfluidic channels 30, in other implementations, fluid actuators 36 may be located at different relative asymmetric locations within their respective microfluidic channels 30. For example, in one implementation, as shown by broken lines, fluid actuator 36A may be located relatively closer to its input end 42 of microfluidic channel 30A as compared to fluid actuator 36B of microfluidic channel 30B. In other words, fluid actuator 36A may be spaced from input end by a first distance while fluid actuator 36B is spaced from its input end 42 by second distance less than the first distance. The different relative asymmetric locations of fluid actuators 36A and 36B may result in different pumping forces or flow rates provided by fluid actuators 36A and 36B in response to fluid actuator 36A and 36B being activated at the same frequency. In some implementations, different microfluidic channels 30 may have different cross-sectional areas that result in different pumping forces or flow rates provided by fluid actuators 36 in response to fluid actuators 36 being activated at the same frequency. In yet other implementations, different fluid actuators 36 may have different sizes or pumping rates which may also result in different pumping forces even when the different fluid actuators 36 are activated at the same frequency. The relative frequencies at which different fluid actuators 36 are activated to achieve the fluid inputting, fluid outputting and fluid blocking states may be varied based at least in part upon different relative asymmetric locations and different size or pumping rates of the different fluid actuators as well as any differences in the cross-sectional areas of the microfluidic channels in which the different fluid actuator 36 are located.

Figure 2:
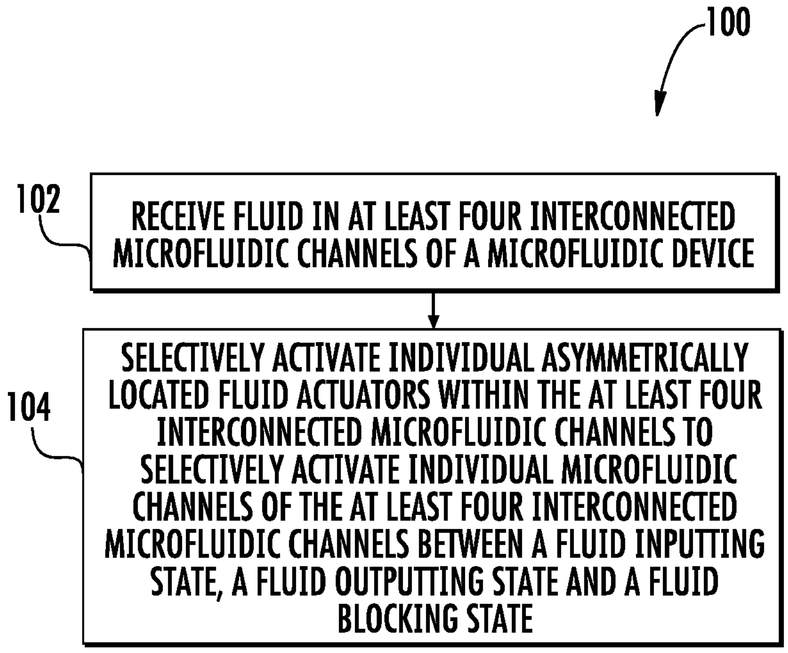
FIG. 2 is a flow diagram of an example method for operating a microfluidic device.

FIG. 2 is a flow diagram of an example method 100 for directing or conveying fluid in a microfluidic device. Method 100 allows selected volume of the fluid to be selectively conveyed from different sources, across different fluid interacting active devices and/or two different destinations by selectively activating different combinations of fluid actuators that serve as inertial pumps. Although method 100 is described in the context of being carried out using microfluidic device 20, it should be appreciated that method 100 may be utilized for carried out with any of the microfluidic devices described hereafter or in other microfluidic devices having at least four interconnected microfluidic channels and a fluid actuator asymmetrically located within each of the at least four microfluidic channels.

As indicated by block 102, microfluidic channels 30 of microfluidic device 20 receive fluid. Such "priming" facilitates pumping by fluid actuators 36. Such priming further reduces the presence of air pockets or the like might otherwise result in unintended mixing of fluids when a microfluidic channel 30 is to be placed in a fluid blocking state.

As indicated by block 104, the asymmetrically located fluid actuators 36 in the at least four interconnected microfluidic channels 30 are individually selectively activated so as to selectively place individual microfluidic channels of the at least four interconnected microfluidic channels in either the fluid inputting state, a fluid outputting state or a fluid blocking state. The relative activation frequencies and/or fluid driving forces (the magnitude of pumping force exerted upon the fluid) of the different fluid actuators 36 may be varied to control the particular state of each microfluidic channels 30. The frequency and/or force at which fluid is driven by a fluid actuator 36 towards interconnection 38 relative to the frequency and/or force at which fluid is driven by another fluid actuator 36 or other fluid actuators 36 of other microfluidic channels may control whether or not the driven fluid passes through and across the interconnection and is output from the microfluidic channel or whether or not the driven fluid does not exit the microfluidic channel, but simply blocks the ingress of fluid being driven by other fluid actuators in other microfluidic channels. The relative frequency at which a particular fluid actuator 36 is driven relative to the frequency at which other fluid actuators 36 are driven may also control not only where fluid is conveyed, but the content of the fluid being conveyed. The relative frequencies of the different fluid actuators may be adjusted to control what percentage of the fluid being conveyed by a first microfluidic channel is from a second microfluidic channel and what percentage of the fluid being conveyed by the first microfluidic channel is from a third microfluidic channel and so forth.

For example, actuation of fluid actuator 36A while fluid actuators 36B, 36C and 36D remain inactive results in microfluidic channel 30A being placed in a fluid inputting state with the remaining microfluidic channels 30B, 30C and 30D being placed in a fluid outputting state. Actuation of fluid actuators 36A and 36B while fluid actuators 36C and 36D remain inactive results in the remaining microfluidic channels 30C and 30D being placed in a fluid outputting state. The relative frequency at which fluid actuators 36A and 36B are individually activated may be varied, based upon the characteristics of microfluidic channels 30A, 30B as well as the characteristics of fluid actuators 36A, 36B, so as to place microfluidic channels 30A and 30B in either the fluid outputting state or a fluid blocking state. In implementations where fluid actuators 36 are activated at relative frequencies such that both microfluidic channels 30A and 30B are placed in fluid output states, the relative frequencies at which fluid actuator 36A and 36B are activated may be further varied to control the relative flow rates of the output from microfluidic channels 30A and 30B. In some implementations, where fluid actuators 36 are activated at relative frequencies such that both microfluidic channels 30A and 30B are placed in fluid output states, the relative frequencies at which fluid actuator 36A and 36B are activated may be further varied to control the relative proportions at which fluid being output from microfluidic channels 30A and 30B are mixed and conveyed to another destination.

Figure 3:
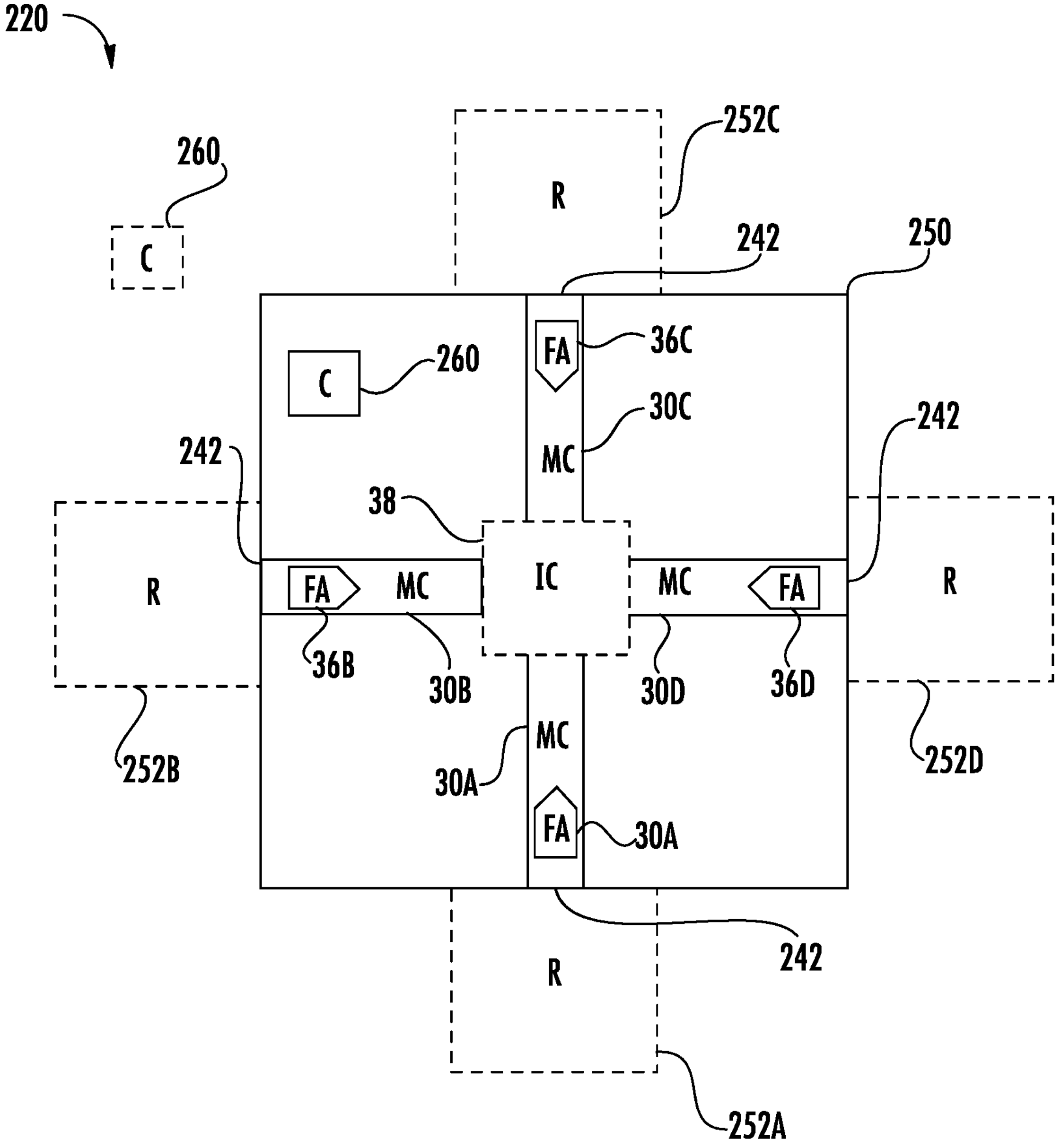
FIG. 3 is a schematic diagram of an example microfluidic device.

FIG. 3 is a diagram schematically illustrating microfluidic device 220, an example implementation of microfluidic device 20 of FIG. 1. Microfluidic device 220 is similar to microfluidic device 20 except that microfluidic device 220 is illustrated as additionally comprising substrate 250, reservoirs 252A, 252B, 252C, 252D (collectively referred to as reservoirs 252) and controller 260. Those remaining components or elements of microfluidic device 220 which correspond to components of microfluidic device 20 are numbered similarly.

Substrate 250 comprises a platform, base or circuit board upon which or in which microfluidic channels 30 and fluid actuators 36 are formed or otherwise provided. In one implementation, substrate 250 comprises a platform formed from a silicon material. In another implementation, substrate 250 comprises a platform formed from a polymer or plastic material. Substrate 250 may have a planar, sheet-like shape or may comprise a three-dimensional shape in which microfluidic channels 30 are formed. As shown by FIG. 3, each of microfluidic channels 30 terminates at port 242 along a perimeter of substrate 250. Each port facilitates connection of the corresponding microfluidic channel 30 to one of reservoirs 252. In one implementation, each port 242 facilitates releasable connection of the corresponding microfluidic channel 32 to one of reservoirs 252. For purposes of this disclosure, the term "releasably" or "removably" with respect to an attachment or coupling of two structures means that the two structures may be repeatedly connected and disconnected to and from one another without material damage to either of the two structures or their functioning.

Reservoirs 252 comprise cavities, chambers, containers or other volumes that lie external to substrate 250 and that are connected to a corresponding one of microfluidic channels 30 at a port 242. In one implementation, selected ones of reservoirs 252 may comprise a fluid supply. For example, in one implementation, one of reservoirs 252 may supply an analyte. In another implementation, one of reservoirs 252 may supply a reagent or other chemical for interacting with an analyte. In one implementation, selected ones of reservoirs 252 may comprise a fluid destination where fluid from other reservoirs, mixed or unmixed, is conveyed.

Controller 260 comprises a processing unit that, following instructions, outputs control signals to selectively activate the individual fluid actuators 36 so as to selectively activate each of the individual microfluidic channels 30 between different states, either a fluid outputting state, a fluid inputting state or a fluid blocking state. For purposes of this disclosure, the term "processing unit" shall mean a presently developed or future developed computing hardware that executes sequences of instructions contained in a non-transitory memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 260 may be embodied as part of one or more application-specific integrated circuits (ASICs). Unless otherwise specifically noted, the controller is not limited to any specific combination of hardware circuitry and software, nor to any particular source for the instructions executed by the processing unit.

Controller 260 may control the relative frequencies at which the different individual fluid actuators 36 are activated depending upon where fluid is to be conveyed. For example, in implementations where fluid actuators 36 each comprise a bubble jet resistor or thermal actuator having a heating element (e.g., a thermal resistor) that may be heated to cause a bubble to form in a fluid proximate the heating element, controller 260 may control the frequency at which the thermal resistor is fired to selectively activate each of the individual microfluidic channels 30 between different states, either a fluid outputting state, a fluid inputting state or a fluid blocking state. Although controller 260 is illustrated as being carried or supported by substrate 250, as indicated by broken lines, in other implementations, controller 260 may be supported or provided external to or independent of substrate 250, wherein controller 260 is connected to or otherwise communicates with fluid actuators 36 in a wired or wireless fashion. For example, in one implementation, substrate 250 may comprise a port or electrical contacts for connection to controller 260 and by which controller 260 communicates with fluid actuators 36. In another implementation, substrate 250 may comprise a transceiver connected to fluid actuators 36 and in communication with an externally located controller 260.

Figure 4:
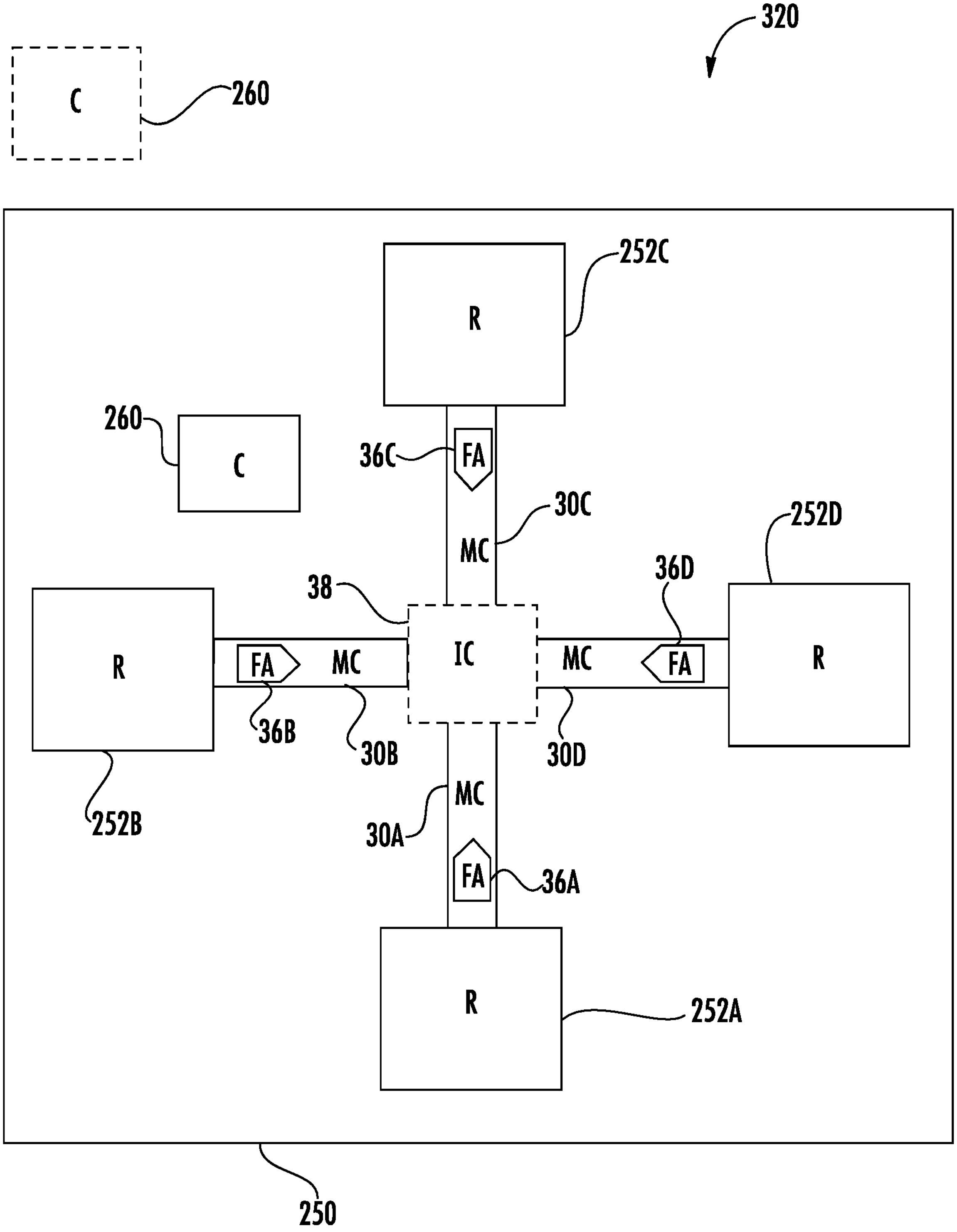
FIG. 4 is a schematic diagram of an example microfluidic device.

FIG. 4 is a diagram schematically illustrating microfluidic device 320, another example implementation of microfluidic device 20. Microfluidic device 320 is similar to microfluidic device 220 except that reservoirs 252 are carried by or supported by substrate 250. Those remaining components of microfluidic device 320 which correspond to components of microfluidic device 220 are numbered similarly. In some implementations, some of reservoirs 252 may be carried or supported by substrate 250 while other of reservoirs 252 are permanently or releasably connected to corresponding microfluidic channels 30 using ports 242 (shown and described with respect to FIG. 3).

Figure 5:
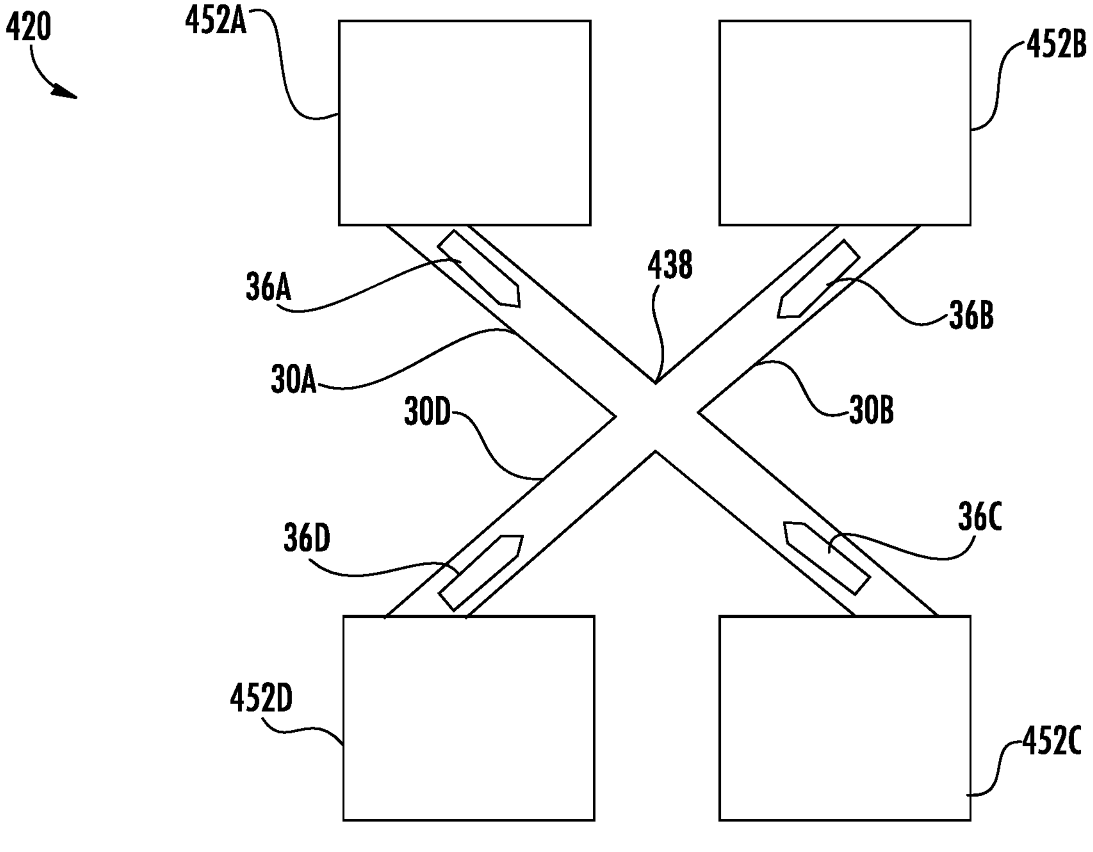
FIG. 5 is a schematic diagram of an example microfluidic device.

FIG. 5 is a diagram schematically illustrating microfluidic device 420, another example implementation of microfluidic device 20. Microfluidic device 420 is similar to microfluidic device 20 except that microfluidic device 420 is specifically illustrated as comprising a four-port configuration in which microfluidic channels 30 are directly interconnected to one another at a direct interconnection 438 and in which each of microfluidic channels 30 has a port 442 connected to a dedicated reservoir 452. As with microfluidic devices 20, 220 and 320, selective activation of fluid actuators 36 by controller, such as controller 260 described above, in accordance with method 100, may be used to selectively activate the individual microfluidic channels to one of a fluid output state, a fluid input state or a fluid blocking state.

Figure 6:
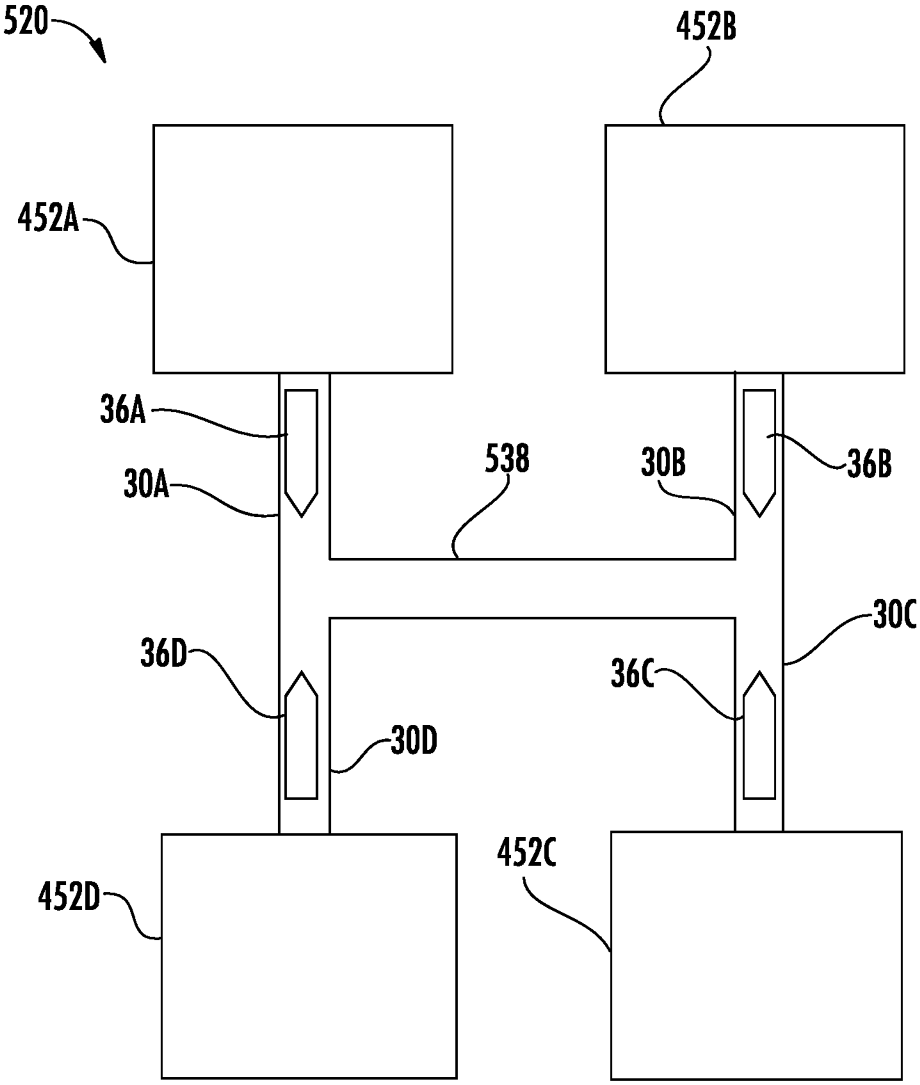
FIG. 6 is a schematic diagram of an example microfluidic device.

FIG. 6 is a diagram schematically illustrating microfluidic device 520, another example implementation of microfluidic device 20. Microfluidic device 520 is similar to microfluidic device 420 described above except that microfluidic device 520 comprises an interconnection which comprises a connecting channel 538 interconnecting microfluidic channels 30A, 30D on the left side with the microfluidic channels 30B and 30C on the right side. As a result, each of microfluidic channels 30 extends from its respective corresponding reservoir 452 to connecting channel 538. In the example illustrated, connecting channel 538 comprises a passive channel, lacking any fluid actuators. In other implementations, connecting channel 538 may comprise a fluid actuator which corresponds to an inertial pump to further facilitate the driving or movement a fluid across connecting channel 538.

Figure 7:
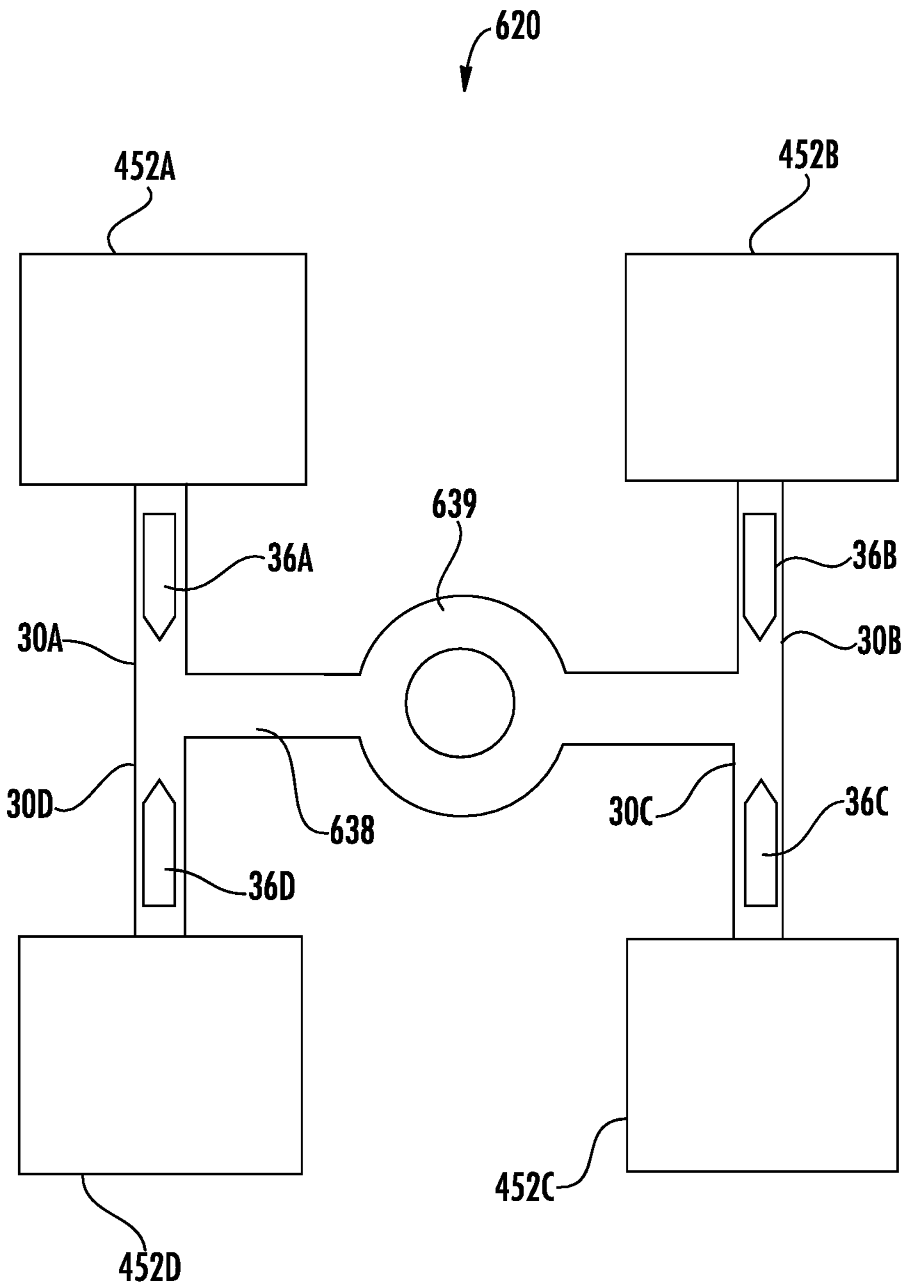
FIG. 7 is a schematic diagram of an example microfluidic device.

FIG. 7 is a diagram schematically illustrating microfluidic device 620, another example implementation of microfluidic device 20. Microfluidic device 620 is similar to microfluidic device 520 except that microfluidic device 620 comprises an interconnect in the form of connecting channel 638 which extends from a junction of microfluidic channels 30A and 30D to a junction of microfluidic channels 30B and 30C. Connecting channel 638 is similar to connecting channel 538 except that connecting channel 638 additionally includes a roundabout portion 639 that may further facilitate mixing.

FIGS. 8-11 illustrate various example operational modes for microfluidic device 520 described above. Although such operational modes are illustrated with respect to microfluidic device 520, it should be appreciated that each of the example modes may also be carried out with any of microfluidic devices 20, 220, 320, 420 and 620 described above or other microfluidic devices having for microfluidic channels that are interconnected, that extend from a dedicated reservoir and that each have an asymmetrically located fluid actuator.

Figure 8:
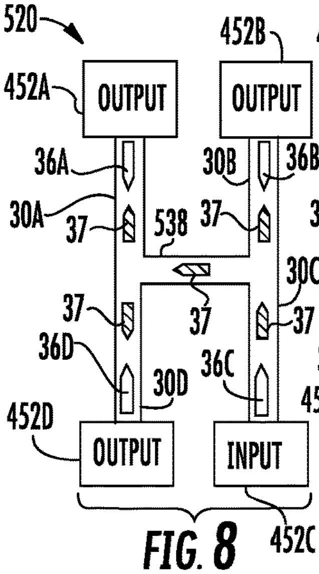
FIG. 8 is a schematic diagram of the microfluidic device of FIG. 6 in a first one pump operational mode.

FIG. 8 illustrates an example one pump operational mode in which a controller, such as controller 260 described above, outputs control signals activating fluid actuator 36C while the remaining fluid actuators 36A, 36B and 36D remain inactive. As a result, microfluidic passage 30C and reservoir 452C are placed in an input state while the remaining reservoirs 452A, 452B, 452D and the remaining microfluidic passages 30A, 30B and 30D are placed in an output state. As indicated by the fluid flow arrows 37, fluid flows from reservoir 452C out of microfluidic channel 30C and into each of reservoirs 452A, 452B and 452D through connecting channel 538, microfluidic channel 30A, through microfluidic channel 30B and through connecting channel 538, microfluidic channel 30D, respectively.

Figure 9:
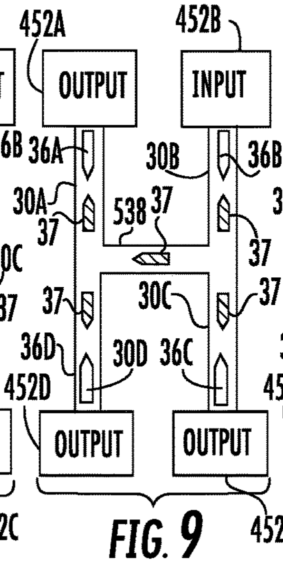
FIG. 9 is a schematic diagram of the microfluidic device of FIG. 6 in a second one pump operational mode.

FIG. 9 illustrates an example one pump operational mode in which a controller, such as controller 260 described above, outputs control signals activating fluid actuator 36B while the remaining fluid actuators 36A, 36C and 36D remain inactive. As a result, microfluidic passage 30B and reservoir 452B are placed in an input state while the remaining reservoirs 452A, 452C, 452D and the remaining microfluidic passages 30A, 30C and 30D are placed in an output state. As indicated by the fluid flow arrows 37, fluid flows from reservoir 452B out of microfluidic channel 30B and into each of reservoirs 452A, 452C and 452D through connecting channel 438, microfluidic channel 30A, through microfluidic channel 30C and through connecting channel 438, microfluidic channel 30D, respectively.

Figure 10:
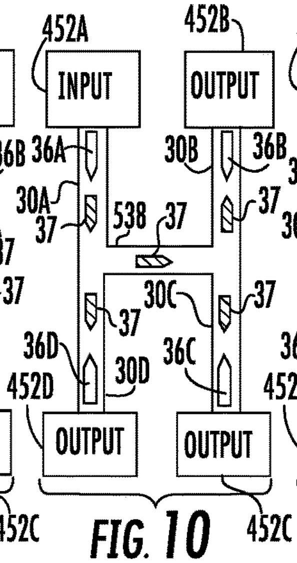
FIG. 10 is a schematic diagram of the microfluidic device of FIG. 6 in a third one pump operational mode.

FIG. 10 illustrates an example one pump operational mode in which a controller, such as controller 260 described above, outputs control signals activating fluid actuator 36A while the remaining fluid actuators 36B, 36C and 36D remain inactive. As a result, microfluidic passage 30A and reservoir 452A are placed in an input state while the remaining reservoirs 452B, 452C, 452D and the remaining microfluidic passages 30B, 30C and 30D are placed in an output state. As indicated by the fluid flow arrows 37, fluid flows from reservoir 452A out of microfluidic channel 30A and into each of reservoirs 452B, 452C and 452D through connecting channel 438, microfluidic channel 30B, through connecting channel 438, microfluidic channel 30B and through microfluidic channel 30D, respectively.

Figure 11:
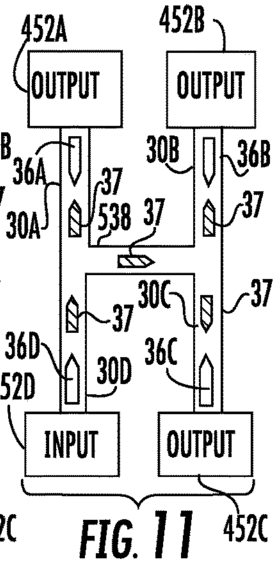
FIG. 11 is a schematic diagram of the microfluidic device of FIG. 6 in a fourth one pump operational mode.

FIG. 11 illustrates an example operational mode in which a controller, such as controller 260 described above, outputs control signals activating fluid actuator 36D while the remaining fluid actuators 36A, 36B and 36C remain inactive. As a result, microfluidic passage 30D and reservoir 452D are placed in an input state while the remaining reservoirs 452A, 452B, 452C and the remaining microfluidic passages 30A, 30B and 30C are placed in an output state. As indicated by the fluid flow arrows 37, fluid flows from reservoir 452D out of microfluidic channel 30D and into each of reservoirs 452A, 452B and 452C through microfluidic channel 30A, through connecting channel 438, microfluidic channel 30B and through connecting channel 438, microfluidic channel 30D, respectively.

FIGS. 12-23 illustrate various example two pump operational modes for microfluidic device 520. In the different illustrated examples, two fluid actuators are activated at various relative frequencies to actuate the different microfluidic passages between different states and to control where fluid is directed within the network of microfluidic channels. Although such operational modes are illustrated with respect to microfluidic device 520, it should be appreciated that each of the example modes may also be carried out with any of microfluidic devices 20, 220, 320, 420 and 620 described above or other microfluidic devices having for microfluidic channels that are interconnected, that extend from a dedicated reservoir and that each have an asymmetrically located fluid actuator.

Figure 12:
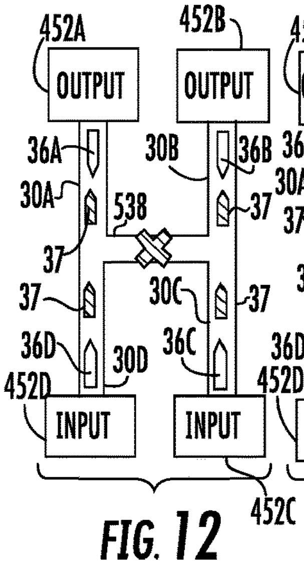
FIGS. 12-23 are schematic diagrams of the microfluidic device of FIG. 6 in various example two pump operational modes.

FIGS. 12-15 illustrate example operational modes wherein fluid actuators 30C and 30D are activated at different frequencies relative to one another while fluid actuators 30A and 30B remain inactive. FIG. 12 illustrates an example two pump operational mode in which a controller, such as controller 260 described above, outputs control signals activating fluid actuator 36C and 36D at frequencies such that fluid within microfluidic channels 30C and 30D is conveyed at substantially the same rate while the remaining fluid actuators 36A, 36B remain inactive. In the example illustrated in which fluid actuator 36C and 36D have similar relative asymmetric locations within their respective microfluidic channels and in which microfluidic channels 30C and 30D have similar cross-sectional areas or flow characteristics, fluid actuator 36C and 36D are activated at substantially similar frequencies. As a result, microfluidic passages 30C, 30D and reservoirs 452C, 452D are placed in an input state while the remaining reservoirs 452B, 452C and the remaining microfluidic passages 30A, 30B are placed in an output state. As indicated by the "X", connecting channel 438 is in a fluid blocking state, wherein fluid does not flow across connecting channel 438. As indicated by the fluid flow arrows 37, fluid flows from reservoir 452C out of microfluidic channel 30C and into reservoir 452B through microfluidic channel 30B. Fluid flows from reservoir 452D out of microfluidic channel 30D and into reservoir 452A through microfluidic channel 30A.

Figure 13:
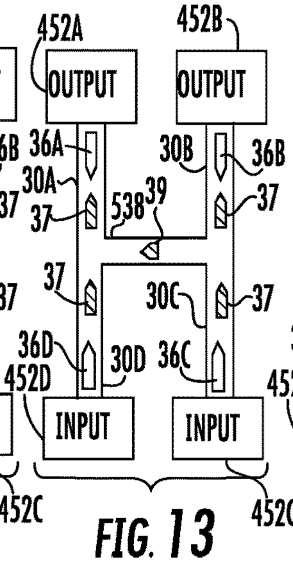

FIG. 13 illustrates an example two pump operational mode in which a controller, such as controller 260 described above, outputs control signals activating fluid actuator 36C and 36D at frequencies such that fluid within microfluidic channels 30C is conveyed at a faster or greater rate as compared to the rate at which fluid is conveyed within microfluidic channel 30D as a result of the activation of fluid actuator 36D at a lower frequency as compared to fluid actuator 36C while the remaining fluid actuators 36A, 36B remain inactive. In the example illustrated in which fluid actuators 36C and 36D have similar relative asymmetric locations within their respective microfluidic channels and in which microfluidic channels 30C and 30D have similar cross-sectional areas are flow characteristics, fluid actuator 36C is activated at a greater frequency than fluid actuator 36D. As a result, microfluidic passages 30C, 30D and reservoirs 452C, 452D are placed in an input state while the remaining reservoirs 452B, 452C and the remaining microfluidic passages 30A, 30B are placed in an output state. As indicated by the fluid flow arrows 37, fluid flows from reservoir 452C out of microfluidic channel 30C and into reservoir 452B through microfluidic channel 30B. Fluid flows from reservoir 452D out of microfluidic channel 30D and into reservoir 452A through microfluidic channel 30A. As further indicated by the smaller fluid flow arrow 39, a portion of the fluid supplied from reservoir 452C is driven across connecting passage 438 and ultimately to reservoir 452A as a result of fluid actuator 36C being activated at a greater frequency than fluid actuator 36D. By controlling the relative frequencies at which fluid actuators 36C and 36D are activated, the relative proportion of fluid being supplied to reservoir 452A from reservoirs 452C and 452D may be varied and controlled.

Figure 14:
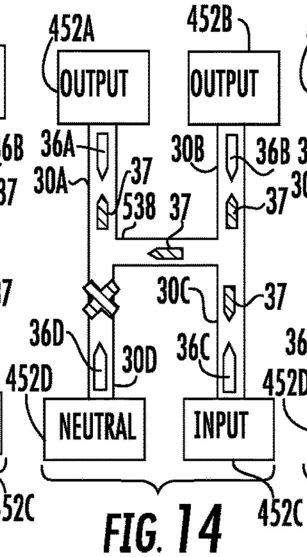

FIG. 14 illustrates an example two pump operational mode in which a controller, such as controller 260 described above, outputs control signals activating fluid actuators 36C and 36D at frequencies such that fluid within microfluidic channels 30C is conveyed at a faster or greater rate as compared to the rate at which fluid is conveyed within microfluidic channel 30D as a result of the activation a fluid actuator 36D being activated at a lower frequency as compared to fluid actuator 36C while the remaining fluid actuators 36A, 36B remain inactive. In the example illustrated, fluid actuator 36D is activated at a lower frequency as compared to the example mode shown in FIG. 13 such that, as indicated by the "X", microfluidic channel 30D is in a fluid blocking state and reservoir 452D is in a neutral state. In the fluid blocking state of channel 452D, the fluid being pumped by fluid actuator 36D does not exit channel 30D and inhibits the ingress of fluid from reservoir 452C into reservoir 452D.

Figure 15:
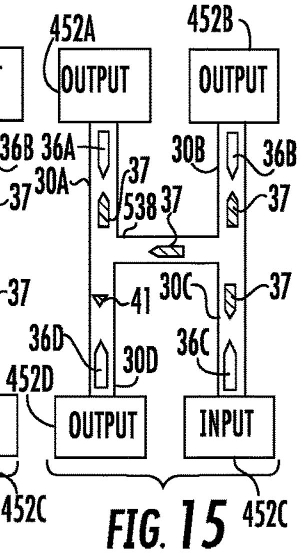

FIG. 15 illustrates an example two pump operational mode in which a controller, such as controller 260 described above, outputs control signals activating fluid actuators 36C and 36D at frequencies such that fluid within microfluidic channels 30C is conveyed at a faster or greater rate as compared to the rate at which fluid is conveyed within microfluidic channel 30D as a result of the activation a fluid actuator 36D and a lower frequency as compared to fluid actuator 36C while the remaining fluid actuators 36A, 36B remain inactive. In the example illustrated, fluid actuator 36D is activated at a lesser frequency as compared to the example mode shown in FIG. 14 such that microfluidic channel 30D and reservoir 452D are both in an output state. As indicated by the smaller fluid flow arrow 41, a portion of the fluid pumped from reservoir 452C through the activation of fluid actuator 36C flows across microfluidic channel 30D into reservoir 452D. A larger percentage of the fluid from reservoir 452C flowing across connecting passage 438 is directed to reservoir 452A than reservoir 452D as a result of the resistance provided by the activation of fluid actuator 36D. By controlling the rate at which fluid actuator 36D is activated, the controller 260 may control and vary the relative proportion of the fluid being transmitted to reservoirs 452A, 452B and 452D.

Figure 16:
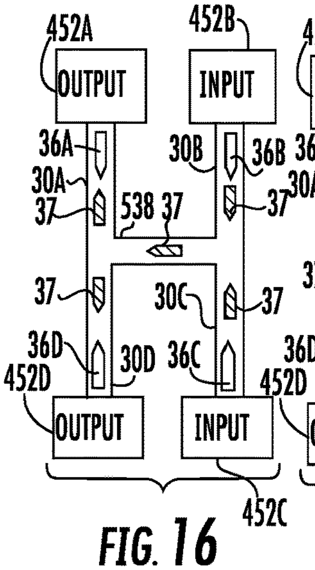

FIGS. 16-19 illustrate example operational modes wherein fluid actuators 30B and 30C are activated at different frequencies relative to one another while fluid actuators 30A and 30D remain inactive. FIG. 16 illustrates an example two pump operational mode in which a controller, such as controller 260 described above, outputs control signals activating fluid actuator 36B and 36C at frequencies such that fluid within microfluidic channels 30B and 30C is conveyed at substantially the same rate while the remaining fluid actuators 36A, 36D remain inactive. In the example illustrated in which fluid actuator 36B and 36C have similar relative asymmetric locations within their respective microfluidic channels and in which microfluidic channels 30B and 30C have similar cross-sectional areas are flow characteristics, fluid actuator 36B and 36C are activated at substantially similar frequencies. As a result, microfluidic passages 30B, 30C and reservoirs 452B, 452B are placed in an input state while the remaining reservoirs 452A, 452D and the remaining microfluidic passages 30A, 30D are placed in an output state. As indicated by the fluid flow arrows 37, fluid flows from reservoir 452B out of microfluidic channel 30B and from reservoir 452C out of microfluidic channel 30C across connecting channel 438 across microfluidic channels 30A and 30D, which are both in fluid output states, into reservoirs 452A and 452D. In one implementation, fluid is pumped into reservoirs 452A and 452D in substantially equal proportions.

Figure 17:
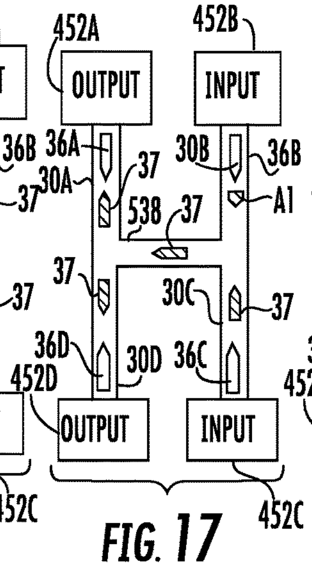

FIG. 17 illustrates an example two pump operational mode in which a controller, such as controller 260 described above, outputs control signals activating fluid actuators 36B and 36C at frequencies such that fluid within microfluidic channels 30C is conveyed at a faster or greater rate as compared to the rate at which fluid is conveyed within microfluidic channel 30B as a result of the activation of fluid actuator 36C at a higher frequency as compared to fluid actuator 36B while the remaining fluid actuators 36A, 36D remain inactive. As indicated by the smaller fluid flow arrow 41, the fluid being pumped from microfluidic channel 30C resists the flow of fluid in microfluidic channel 30B into connecting channel 538. As a result, a larger portion of the fluid conveyed across connecting channel 438 ultimately to each of reservoirs 425A and 425D is from reservoir 425C as compared to reservoir 425B.

Figure 18:
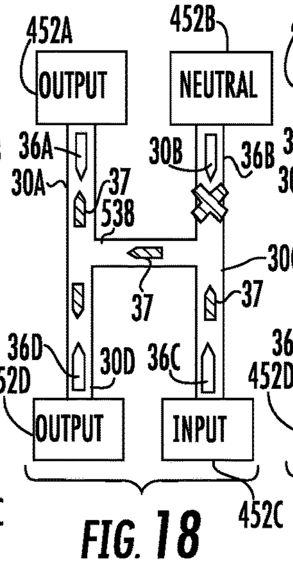

FIG. 18 illustrates an example two pump operational mode in which a controller, such as controller 260 described above, outputs control signals activating fluid actuators 36B and 36C at frequencies such that fluid within microfluidic channels 30C is conveyed at a faster or greater rate as compared to the rate at which fluid is conveyed within microfluidic channel 30B as a result of the activation of fluid actuator 36C at a greater frequency as compared to fluid actuator 36B while the remaining fluid actuators 36A, 36D remain inactive. In the example illustrated, fluid actuator 36B is activated at a lesser frequency as compared to the example mode shown in FIG. 17 such that, as indicated by the "X", microfluidic channel 30B is in a fluid blocking state and reservoir 452B is in a neutral state. In the fluid blocking state of channel 452B, the fluid being pumped by fluid actuator 36B does not exit channel 30B and inhibits the ingress of fluid from reservoir 452C into reservoir 452B.

Figure 19:
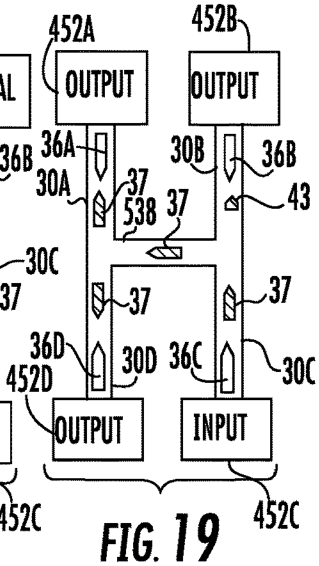

FIG. 19 illustrates an example two pump operational mode in which a controller, such as controller 260 described above, outputs control signals activating fluid actuators 36B and 36C at frequencies such that fluid within microfluidic channels 30C is conveyed at a faster or greater rate as compared to the rate at which fluid is conveyed within microfluidic channel 30B as a result of the activation of fluid actuator 36C while the remaining fluid actuators 36A, 36D remain inactive. In the example illustrated, fluid actuator 36B is activated at a lesser frequency as compared to the example mode shown in FIG. 18 such that microfluidic channel 30B and reservoir 452B are both in an output state. As indicated by the smaller fluid flow arrow 43, a portion of the fluid pumped from reservoir 452C through the activation of fluid actuator 36C flows across microfluidic channel 30B into reservoir 452B.

Figure 20:
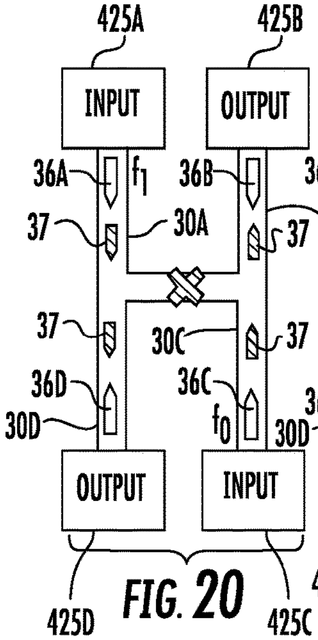

FIGS. 20-23 illustrate example operational modes wherein fluid actuators 30A and 30C are activated at different frequencies relative to one another while fluid actuators 30B and 30D remain inactive. FIG. 20 illustrates an example two pump operational mode in which a controller, such as controller 260 described above, outputs control signals activating fluid actuator 36A and 36C at frequencies such that fluid within microfluidic channels 30A and 30C is conveyed at substantially the same rate while the remaining fluid actuators 36B, 36D remain inactive. In the example illustrated in which fluid actuator 36A and 36C have similar relative asymmetric locations within their respective microfluidic channels and in which microfluidic channels 30A and 30C have similar cross-sectional areas or flow characteristics, fluid actuator 36A and 36C are activated at substantially similar frequencies. As a result, microfluidic passages 30A, 30C and reservoirs 452A, 452C are placed in an input state while the remaining reservoirs 452B, 452D and the remaining microfluidic passages 30B, 30D are placed in an output state. As indicated by the fluid flow arrows 37, fluid flows from reservoir 452A out of microfluidic channel 30A across microfluidic channel 30D and into reservoir 452D. Fluid flows from reservoir 452B out of microfluidic channel 30B across microfluidic channel 30C into reservoir 452C. As indicated by the "X", connecting passage 438 is placed in a fluid blocking state such that fluid does not flow across microfluidic channel 438.

Figure 21:
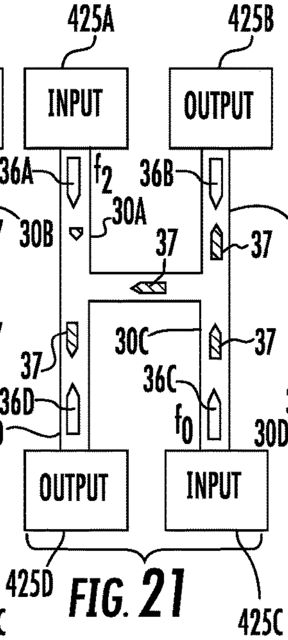

FIG. 21 illustrates an example two pump operational mode in which a controller, such as controller 260 described above, outputs control signals activating fluid actuators 36A and 36C at frequencies such that fluid within microfluidic channels 30C is conveyed at a faster or greater rate as compared to the rate at which fluid is conveyed within microfluidic channel 30A as a result of the activation of fluid actuator 36C at a greater frequency as compared to the activation of fluid actuator 36A while the remaining fluid actuators 36B, 36D remain inactive. In the example illustrated, fluid actuator 36A is activated at a lesser frequency as compared to the example mode shown in FIG. 20. As a result, reservoir 452D receives a greater portion of fluid from reservoir 452C than reservoir 452A.

Figure 22:
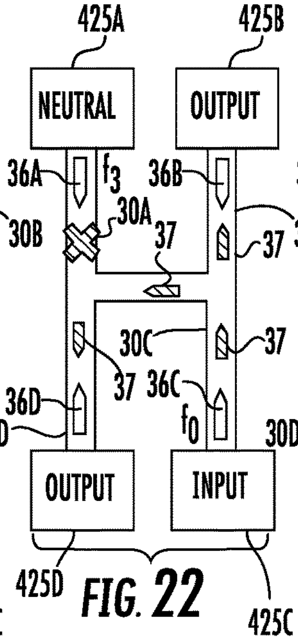

FIG. 22 illustrates an example two pump operational mode in which a controller, such as controller 260 described above, outputs control signals activating fluid actuators 36A and 36C at frequencies such that fluid within microfluidic channels 30C is conveyed at a faster or greater rate as compared to the rate at which fluid is conveyed within microfluidic channel 30A as a result of the activation of fluid actuator 36C at a greater frequency as compared to that of fluid actuator 36A while the remaining fluid actuators 36B, 36D remain inactive. The frequency at which fluid actuator 36A is activated is less than the frequency at which fluid actuator 36A is activated in the mode illustrated in FIG. 21 such that microfluidic channel 30A is placed in a fluid blocking state while reservoir 452A is placed in a neutral state. In the example illustrated, fluid from reservoir 452C is directed to reservoir 452B and across connecting channel 438 to reservoir 452D.

Figure 23:
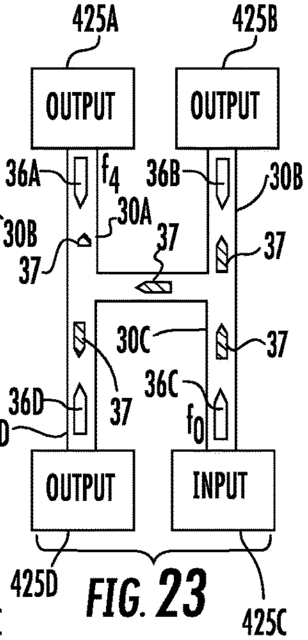

FIG. 23 illustrates an example two pump operational mode in which a controller, such as controller 260 described above, outputs control signals activating fluid actuators 36A and 36C at frequencies such that fluid within microfluidic channels 30C is conveyed at a faster or greater rate as compared to the rate at which fluid is conveyed within microfluidic channel 30A as a result of the activation of fluid actuator 36C at a greater frequency as compared to fluid actuator 36A while the remaining fluid actuators 36B, 36D remain inactive. In the example illustrated, fluid actuator 36A is activated at a lesser frequency as compared to the example mode shown in FIG. 22 such that as indicated by fluid flow arrow 47, fluid originating from reservoir 452C overtakes the flow within microfluidic channel 30A, placing microfluidic channel 30A and reservoir 452A in output states.

Figure 24:
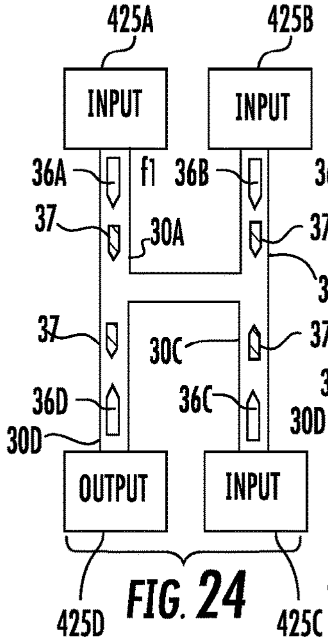
FIGS. 24-26 are schematic diagrams of the microfluidic device of FIG. 6 in various example three pump operational modes.
Figure 25:
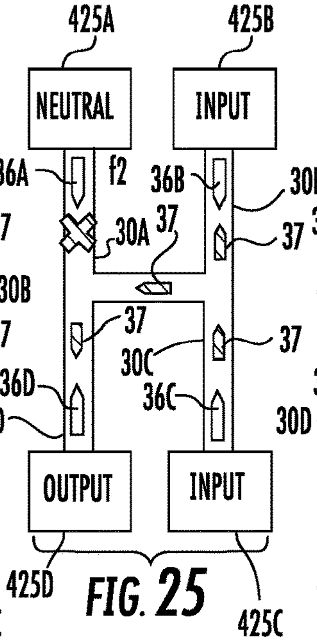
Figure 26:
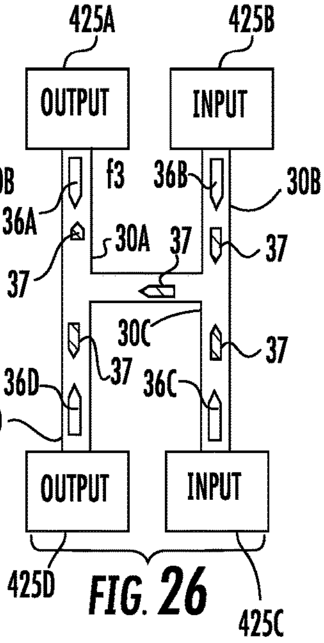

FIGS. 24-26 illustrate example three pump operational modes, wherein fluid actuators 30A, 30B and 30C are activated at different frequencies relative to one another while fluid actuator 36D remains inactive. FIG. 24 illustrates an example three pump operational mode in which a controller, such as controller 260 described above, outputs control signals activating fluid actuator 36A, 36B and 36C at frequencies such that fluid within microfluidic channels 30A, 30B and 30C is conveyed at substantially the same rate while the remaining fluid actuator 36D remains inactive. As a result, microfluidic channels 30A, 30B and 30C along with their respective reservoirs 452A, 452B and 452C, respectively, are placed in an input state while microfluidic channel 30D and its associated reservoir 452D are in an output state. Such an implementation, fluid from each of reservoirs 452A, 452B and 452C is directed into reservoir 452D.

FIG. 25 illustrates an example three pump operational mode in which a controller, such as controller 260 described above, outputs control signals activating fluid actuators 36A, 36B and 36C at frequencies such that fluid within microfluidic channels 30A is conveyed at a slower or lesser rate as compared to the rate at which fluid is conveyed within microfluidic channel 30B and 30C as a result of the activation of fluid actuator 36A at a lesser frequency as compared to that of fluid actuators 36B and 36C while the remaining fluid actuator 36D remains inactive. In the mode illustrated in FIG. 25, fluid actuator 36A is activated at a frequency such that microfluidic channel 30A is placed in a fluid blocking state while reservoir 425A is placed in a neutral state. As a result, reservoir 425D receives fluid from reservoirs 425B and 425C.

FIG. 26 illustrates an example three pump operational mode in which a controller, such as controller 260 described above, outputs control signals activating fluid actuators 36A, 36B and 36C at frequencies such that fluid within microfluidic channels 30A is conveyed at a slower or lesser rate as compared to the rate at which fluid is conveyed within microfluidic channel 30B and 30C as a result of the activation of fluid actuator 36A at a lesser frequency as compared to that of fluid actuators 36B and 36C while the remaining fluid actuator 36D remains inactive. In the mode illustrated in FIG. 25, fluid actuator 36A is activated a frequency less than the frequency shown in the mode illustrated in FIG. 25 such that microfluidic channel 30A and reservoir 425A are placed in a fluid output state. As a result, reservoirs 425A and 425D each receive fluid from reservoirs 425B and 425C. As a result of the resistance provided through the lesser activation of fluid actuator 36A, reservoir 425D receives a greater portion of the fluid from reservoirs 425B and 425C as compared to reservoir 425A. It should be appreciated that the relative proportions of the fluid from reservoirs 425B and 425C that are received by reservoirs 425A and 425D may be controlled or varied by adjusting the frequency at which fluid actuator 36A is activated relative to the frequency at which fluid actuators 36B and 36C are activated.

Figure 27:
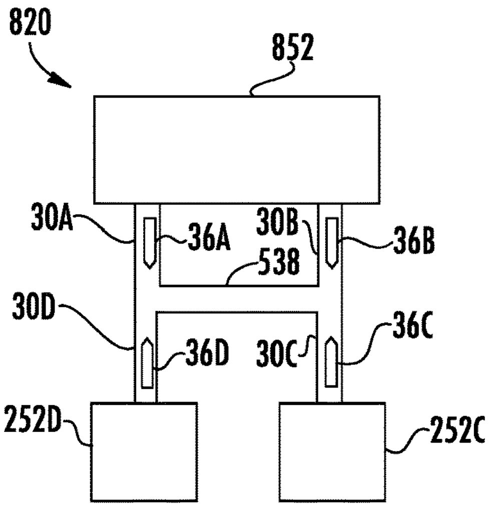
FIG. 27 is a schematic diagram of an example microfluidic device.

In each of the above examples, each microfluidic channel receives fluid from and/or supplies fluid to a single reservoir. In other implementations, more than one microfluidic channel of the at least four microfluidic channels may receive fluid from and/or supply fluid to a single reservoir. In other words, microfluidic channels may share a single reservoir. FIG. 27 is a diagram illustrating an example microfluidic device 820, an example implementation of microfluidic device 20. Microfluidic device 820 is similar to microfluidic device 520 described above except that with microfluidic device 620, microfluidic channels 30A and 30B are both fluidly coupled to a single or same reservoir 852 which replaces the two individual reservoirs 452A and 452B. As with microfluidic device 520, each of the fluid actuators of microfluidic device 820 may be selectively activated by a controller to selectively activate each microfluidic channel between a fluid input state, a fluid output state and a fluid blocking state.

Figure 28:
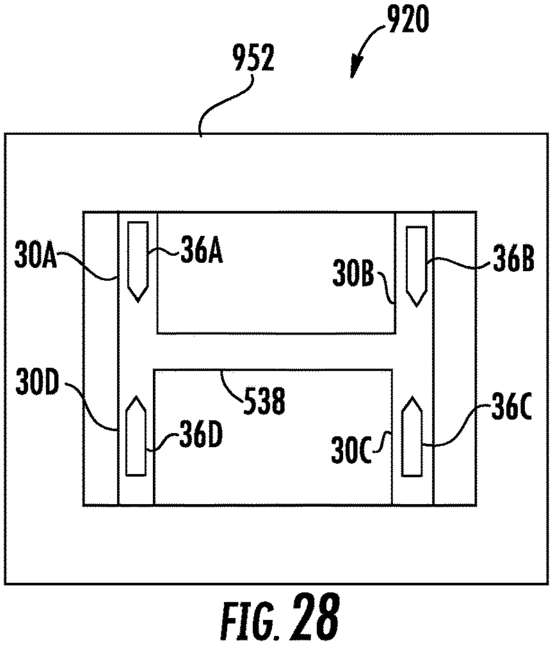
FIG. 28 is a schematic diagram of an example microfluidic device.

FIG. 28 is a diagram illustrating an example microfluidic device 920, an example implementation of microfluidic device 20. Microfluidic device 920 is similar to microfluidic device 520 described above except that with microfluidic device 920, each of microfluidic channels 30A, 30B, 30C and 30D are fluidly coupled to a single or same reservoir 952 which replaces the four individual reservoirs. As with microfluidic device 520, each of the fluid actuators of microfluidic device 920 may be selectively activated by a controller to selectively activate each microfluidic channel between a fluid input state, a fluid output state and a fluid blocking state.

Figure 29:
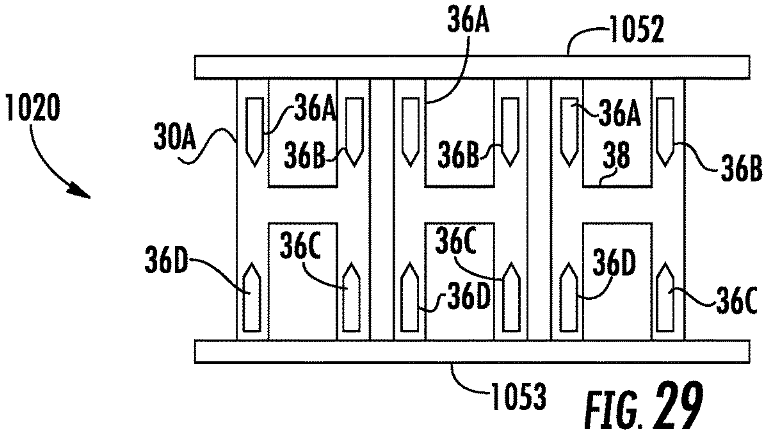
FIG. 29 is a schematic diagram of an example microfluidic device.

FIG. 29 is a diagram illustrating an example microfluidic device 1020, an example implementation of microfluidic device 20. Microfluidic device 1020 comprises a plurality of microfluidic devices 520 a range between two reservoirs 1052, 1053. In the example illustrated, microfluidic device 1020 comprises three microfluidic devices 520, wherein microfluidic channels 30A and 30B of each microfluidic device 520 are fluidly connected directly to reservoir 1052 and wherein microfluidic channels 30C and 30D of each microfluidic device 520 are fluidly connected directly to reservoir 1053.

Figure 30:
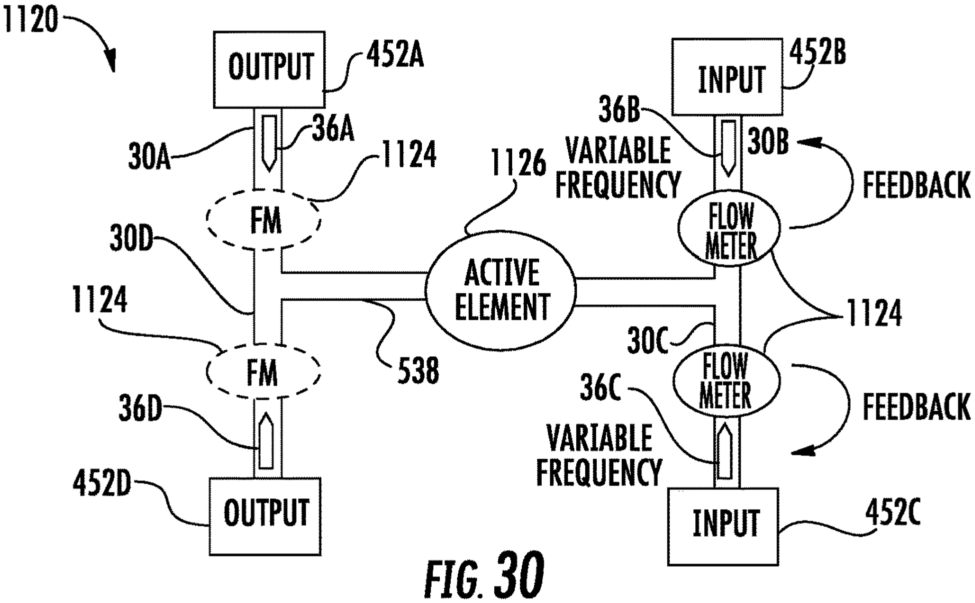
FIG. 30 is a schematic diagram of an example microfluidic device.

FIG. 30 is a diagram schematically illustrating microfluidic device 1120, an example implementation of microfluidic device 20. Microfluidic device 1120 is similar to microfluidic device 520 except that microfluidic device 1120 additionally comprises flow meters 1124 and active element 1126. Those remaining components of microfluidic device 1120 which correspond to components of microfluidic device 520 are numbered similarly. As should be appreciated, microfluidic device 1120 may additionally comprise a controller for outputting control signals to selectively activate the individual fluid actuators 36 to selectively activate the individual microfluidic channels between fluid inputting, fluid outputting and fluid blocking states.

Flow meters 1124 comprise devices that sense or detect the flow of fluid. In the example illustrated, a flow meter 1124 is provided in each microfluidic channels 30B and 30C to sense an output signals indicating the rate of fluid flow in each of microfluidic channels 30B and 30C. Such signals are communicated to the controller, such as controller 260 that controls the activation, such as a frequency of activation of fluid actuators 36B and 36C. Flow meters 1124 provide closed-loop feedback to the controller such that the controller may iteratively and dynamically adjust the frequency at which fluid actuators 36B and 36C are activated to more precisely achieve a desired flow rate and a desired relative flow rate as between fluid actuators 36B and 36C in the fluid being supplied from their respective reservoirs 452B and 452C.

Although microfluidic device 1120 is illustrated as having flow meters 1124 in those microfluidic channels that are in input states, in other implementations, microfluidic device 1120 may further comprise flow meters 1124 in microfluidic channels that are also in output states, providing further feedback regarding the actual flow rates that are being achieved within such microfluidic channels. In one implementation, each of the at least four microfluidic channels includes a flow meter 1124 providing flow rate information to the controller to facilitate adjustments to the activation frequency for those specific fluid actuators that are being activated in a given mode. In some implementations, connecting channel 438 may additionally include a flow meter 1124 on either side or both sides of active element 1126.

Active element 1126 comprises a device or element that interacts with the fluid flow or with particles or components of the fluid flow. Examples of active element 1126 include, but are not limited to, a heater, a fluid mixer, a fluid sensor, a chemical reaction chamber and a fluid capacitor. For example, in one implementation, active element 1126 may comprise a heater, such as an electric resistive heater that emits heat in response to electrical current. In such an implementation, active element 1126 may be activated in response to signals from a controller, such as controller 260, to selectively heat the fluid to a selected temperature or by a selected number of degrees as a fluid flows past active element 1126.

In another implementation, active element 1126 may comprise a device that assists in mixing the fluid as a fluid flows past active element 1126. For example, in one implementation, active element 1126 may comprise a series or grid of posts or columns through which the fluid flows and is further mixed. In yet other implementations, active 1126 may comprise micro-electromechanical structures that physically agitate or vibrates the fluid to mix the fluid.

In yet another implementation, active element 1126 may comprise a device that senses attributes or characteristics of the fluid flowing past active element 1126. For example, active element 1126 may comprise a device that counts the number of cells or particles in the fluid passing across active element 1126. In one implementation, active element 1126 may comprise an electric field or impedance sensor which establishes an electric field across connecting channel 438, wherein changes in the impedance of the electric field brought about by particles or cells flowing through the electric field is detected and utilized to count the number or rate at which such particles or cells are flowing past active element 1126.

In yet another implementation, active element 1126 may comprise a sensor that assists in the identification of the fluid or the identification of components in the fluid. For example, active element 1126 may comprise a Raman spectroscopy sensor or other optical sensing devices. Through the selective activation of fluid actuators 36, the controller, such as controller 260, may control the mixture composition as well as the rate at which fluid is conveyed across or to the active element 1126. In some implementations, signals from active element 1126 may be used by the controller to adjust the relative frequencies at which fluid actuators 36 are activated. In yet other implementations, the operation of active element 1126 may be controlled based upon the fluid flow rate across connecting channel 438 and/or across active element 1126. For example, in implementations where active element 1126 comprises a heater, the being output by the heater may be increased by the controller in response to an increased flow rate. In another implementation, the heat being output by active element 1126 may be varied based upon the particular mixture of the fluid flowing across the active element, wherein the particular mixture may be dependent upon which reservoirs and associated microfluidic channels are in an input state.

In yet another implementation, active element 1126 may comprise a fluid ejector, a device that selectively ejects fluid from the channel or volume in to a receiver such as a waste receptacle or another channel or volume. For example, in one implementation, active element may comprise a fluid ejector having a nozzle, wherein fluid is selectively ejected through the nozzle using a bubble jet resistor, and actuated membrane or other fluid ejection technology. In still other implementations, active element 1126 may comprise a fluid capacitor or a chemical reaction chamber.

Figure 31:
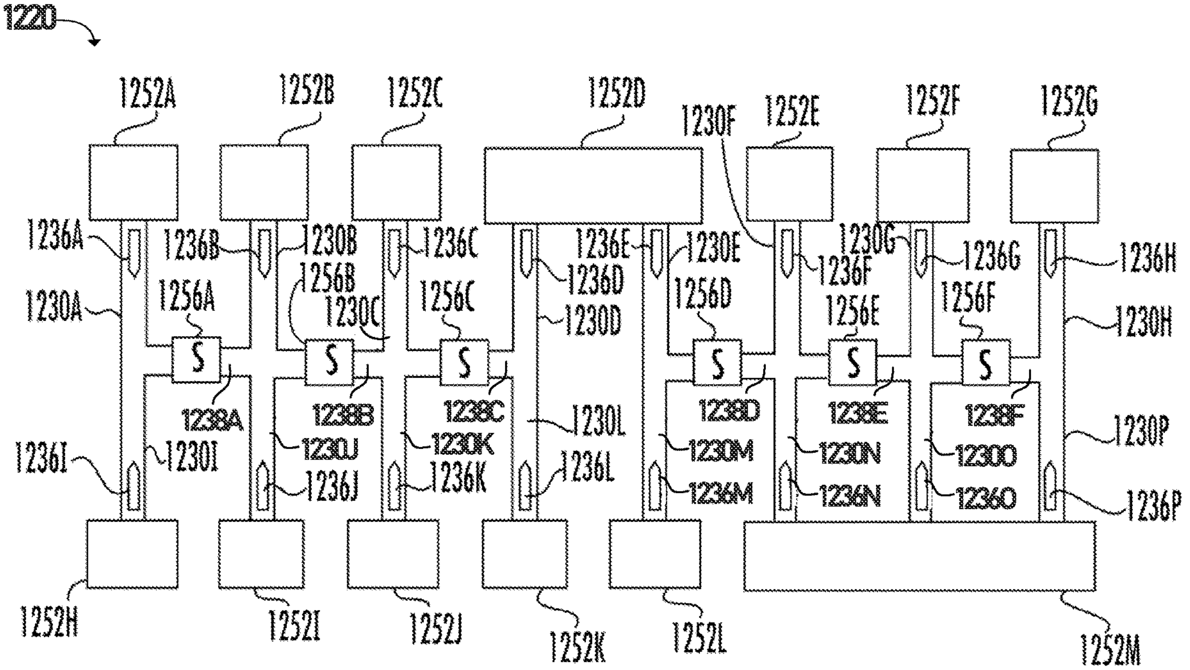
FIG. 31 is a schematic diagram of an example microfluidic device.

FIG. 31 is a diagram schematically illustrating an example microfluidic device 1220, an example implementation of microfluidic device 20. Microfluidic device 1220 comprises microfluidic channels 1230A, 1230B, 1230C, 1230D, 1230E, 1230F, 1230G, 1230H, 1230I, 1230J, 1230K, 1230L, 1230M, 1230N, 12300 and 1230P (collectively referred to as microfluidic channels 1230, fluid actuators 1236A, 1236B, 1236C, 1236D, 1236E, 1236F, 1236G, 1236H, 1236I, 1236J, 1236K, 1236L, 1236M, 1236N, 12360 and 1236P (collectively referred to as fluid actuators 1236), connecting channels 1238A, 1238B, 1238C, 1238D, 1238E and 1238F (collectively referred to as connecting channels 1238) and reservoirs 1252A, 1252B, 1252C, 1252D, 1252E, 1252F, 1252G, 1252H, 1252I, 1252J, 1252K, 1252L, 1252M (collectively referred to as reservoirs 1252) and active elements, shown as fluid sensors 1256A, 1256B, 1256C, 1256D, 1256E and 1256F (collectively referred to as sensors 1256). Channels 1230, fluid actuators 1236, connecting channels 1238 and reservoirs 1252 are substantially similar to channels 30, fluid actuator 36, connecting channels 538 and reservoirs 252, respectively, described above, but for their specific arrangement as illustrated in FIG. 31.

Sensors 1256 are located within each of connecting channels 1238 sense a characteristic of the fluid flowing through each respective connecting channel 1238. As shown by FIG. 31, microfluidic channels 1230D and 1230E both extend from and are fluidly connected to reservoir 1252D. Likewise, microfluidic channels 1230N, 12300 and 1230P extend from reservoir 1252M. FIG. 31 illustrates but one example of a complex network of microfluidic channels and inter-dispersed active elements, such as sensors 1256. Through selective actuation of the individual fluid actuators 1236, a controller, such as controller 266 may direct and route fluid to and from the various reservoirs 1252 to achieve various mixers which are sensed by selected sensors 1256. In other implementations, microfluidic device 1220 may have various other arrangements.

Figure 32:
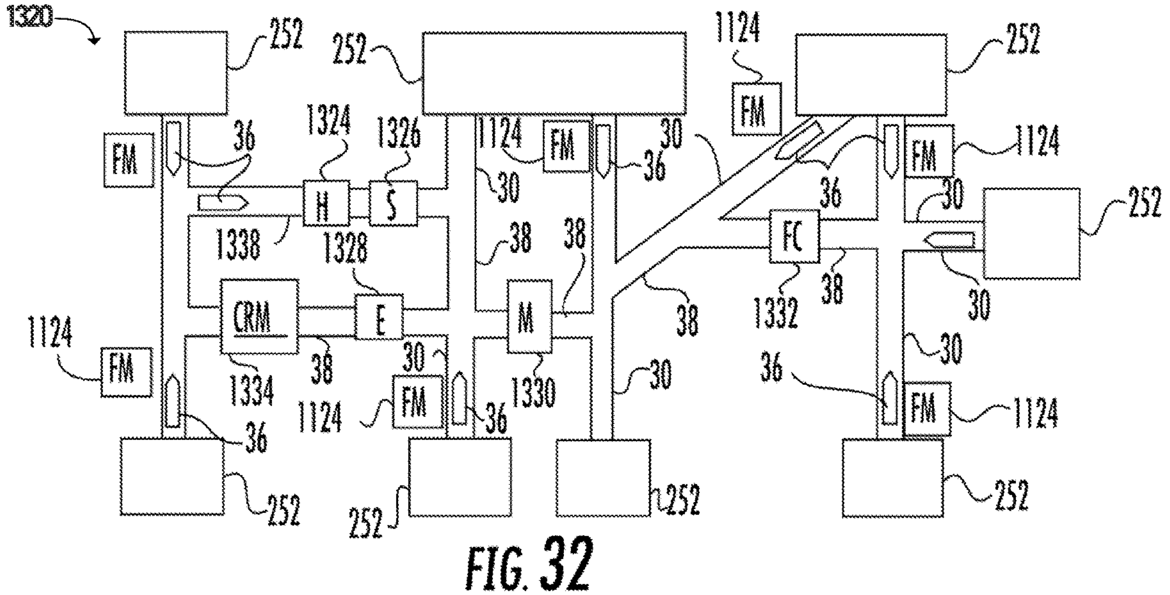
FIG. 32 is a schematic diagram of an example microfluidic device.

FIG. 32 is a diagram schematically illustrating microfluidic device 1320, an example implementation of microfluidic device 20. Microfluidic device 1320 illustrates another example network or microfluidic "switchboard" comprising at least four interconnection microfluidic channels and asymmetrically located fluid actuators that facilitate selective activation of different microfluidic channels between fluid inputting states, fluid output in states in fluid blocking states to controllably direct fluid between different selected reservoirs and across different active elements.

Microfluidic device 1320 comprises multiple microfluidic channels 30, multiple fluid actuators 36, multiple connecting channels 538 and multiple reservoirs 452, similar to those components described above but for the layout and arrangement shown in the example. Microfluidic device 1320 further comprises multiple flow meters 1124 (described above) and multiple different active elements in the form of a heater 1324, a fluid sensor 1326, a fluid ejector 1328, a fluid mixer 1330, a fluid capacitor 1332 and a chemical reaction chamber 1334. Each of the different types of active elements as described above.

As further illustrated by FIG. 32, microfluidic device 1320 comprises a connecting channel 1338 that includes an additional fluid actuator 36 asymmetrically located within the connecting channel 1338 to facilitate pumping her movement of fluid within the connecting channel 1338. As shown by FIG. 32, microfluidic device 1320 may comprise additional microfluidic channels that do not include a fluid actuator. In other implementations, microfluidic device 1320 may have various other combinations of microfluidic channels, fluid actuators, reservoirs and active elements in various other layouts or arrangements. As with each of the example disclosed implementations, microfluidic device 1320 may additionally include the controller 260 (shown and described above) for selectively activating each of the individual fluid actuators 36 to selectively activate the microfluidic channels between fluid inputting, fluid outputting and fluid blocking state to selectively direct fluid between selected reservoirs and across selected active elements.

Figure 33:
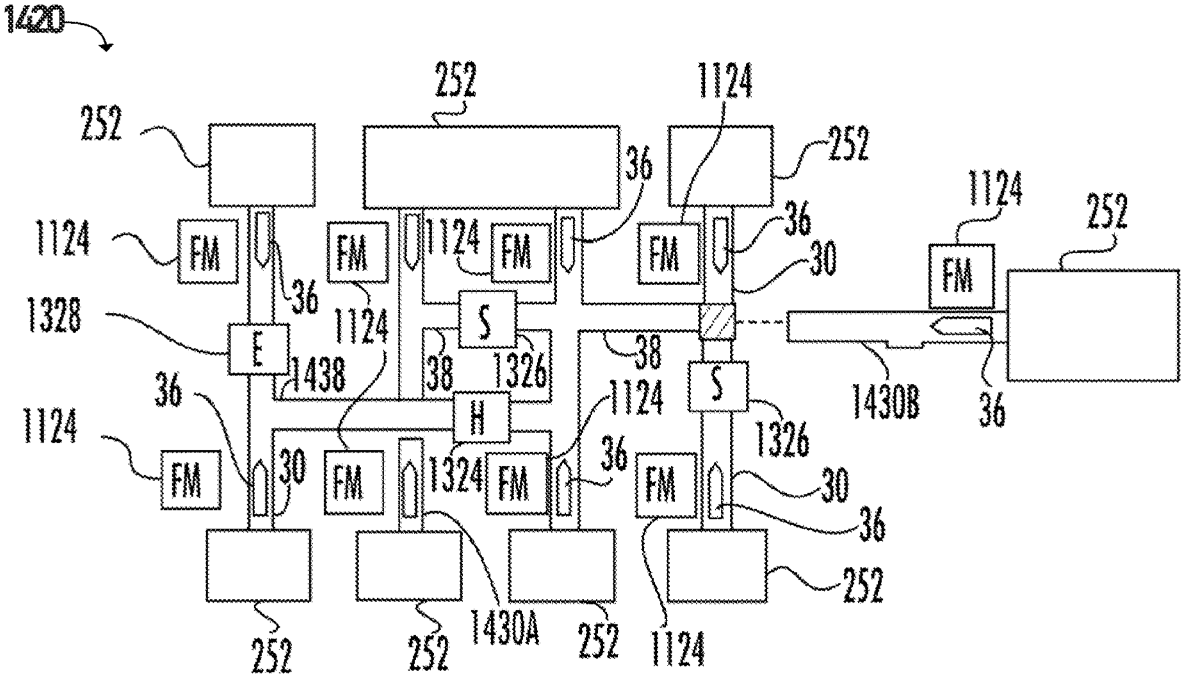
FIG. 33 is a schematic diagram of an example microfluidic device.

FIG. 33 is a diagram schematically illustrating an example microfluidic device 1420, another example implementation of microfluidic device 20. Microfluidic device 1420 illustrates another example network or microfluidic "switchboard" comprising at least four interconnection microfluidic channels and asymmetrically located fluid actuators that facilitate selective activation of different microfluidic channels between fluid inputting states, fluid output in states in fluid blocking states to controllably direct fluid between different selected reservoirs and across different active elements.

As with microfluidic device 1320, microfluidic device 1420 comprises multiple microfluidic channels 30, multiple fluid actuators 36, multiple connecting channels 538 and multiple reservoirs 452, similar to those components described above but for the layout and arrangement shown in the example. Microfluidic device 1320 further comprises multiple flow meters 1124 (described above) and multiple different active elements in the form of a heater 1324, a fluid sensor 1326 and a fluid ejector 1328. Each of the different types of active elements as described above.

As further illustrated by FIG. 33, microfluidic device 1320 comprises microfluidic channels 30 and/or connecting channels 538 having a three-dimensional architecture. In other words, microfluidic channels 30 and connecting channels 538 extend within different planes. In the example illustrated, microfluidic channels 30 and connecting channels 538 have centerlines that extend within different planes and that extend in all three orthogonal directions, along the x-axis, the y-axis and the z-axis. As shown by FIG. 33, the example microfluidic device 1420 specifically includes a connecting channel 1438 that extends over or bridges over an underlying microfluidic channel 1430A. In the example illustrated, microfluidic device 1420 further comprises a microfluidic channel 1430B that extends in the z-axis (out of the plane of the drawing sheet as indicated by hatching) and is connected to a reservoir 1452 above the other reservoirs. The three dimensionality of microfluidic device 1420 provides a complex network or "switchboard" that may be more compact.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed:

1. A microfluidic device comprising:

at least four interconnected microfluidic channels;

a set of fluid actuators comprising a fluid actuator asymmetrically located within at least two of the at least four interconnected microfluidic channels such that at least two of the at least four interconnected microfluidic channels may be activated to a fluid inputting state, a fluid outputting state and a fluid blocking state in response to selective actuation of different combinations of fluid actuators of the set, wherein the set of fluid actuators are activated at a same frequency and result in different flow rates of fluid within the interconnected microfluidic channels; and one connecting channel extending between the first one of the at least four interconnected microfluidic channels to a second one of the at least four interconnected microfluidic channels wherein the one connecting channel is a passive channel lacking any fluid actuators.

2. The microfluidic device of claim 1 wherein the one connecting channel comprises a roundabout portion forming a circular channel to facilitate mixing.

3. The microfluidic device of claim 1 wherein a direction of a fluid flows through the one connecting channel is dependent upon which of the set of fluid actuators are active and which are inactive.

4. The microfluidic device of claim 1 further comprising a bridging microfluidic channel fluidly coupled to the at least four interconnected microfluidic channels and extending over at least one of the at least four interconnected microfluidic channels.

5. The microfluidic device of claim 1 further comprising a reservoir, wherein the at least four interconnected microfluidic channels comprise:

a first microfluidic channel extending from the reservoir; and a second microfluidic channel extending from the reservoir.

6. The microfluidic device of claim 5 further comprising:

a third microfluidic channel extending from the reservoir; and a fourth microfluidic channel extending from the reservoir.

7. The microfluidic device of claim 1 further comprising reservoirs, wherein each of the at least four interconnected microfluidic channels extends from a different one of the reservoirs.

8. The microfluidic device of claim 1, wherein at least one of the fluid actuators comprises an inertial pump.

9. The microfluidic device of claim 1, further comprising a flow meter located to sense fluid flow speed in one of the at least four interconnected microfluidic channels.

10. The microfluidic device of claim 9 further comprising a second flow meter located to sense fluid flow speed in a second one of the at least four interconnected microfluidic channels.

11. The microfluidic device of claim 1 further comprising an active element fluidly coupled to at least one of the at least four interconnected microfluidic channels.

12. The microfluidic device of claim 11, wherein the active element selected from a group of active elements consisting of a fluid ejector, a fluid characteristic sensor, a fluid heater, a fluid mixer, a chemical reaction chamber a fluid ejector and a fluid capacitor.

13. The microfluidic device of claim 1 further comprising a passive microfluidic channel fluidly coupled to the at least four interconnected microfluidic channels, the passive channel omitting a fluid actuator.

14. A microfluidic device comprising:

a substrate;

at least four interconnected microfluidic channels supported by the substrate; and a set of fluid actuators supported by the substrate and comprising a fluid actuator asymmetrically located within at least two of the at least four interconnected microfluidic channels;

one connecting channel extending between the first one of the at least four interconnected microfluidic channels to a second one of the at least four interconnected microfluidic channels wherein the one connecting channel is a passive channel lacking any fluid actuators; and a controller in communication with the set of fluid actuators, the controller to selectively actuate different combinations of fluid actuators of the set of fluid actuators to activate each of the at least four interconnected microfluidic channels between a fluid inputting state, a fluid outputting state and a fluid blocking, wherein the set of fluid actuators are activated at a same frequency and result in different flow rates of fluid within the interconnected microfluidic channels.

15. A method comprising:

receiving fluid in at least four interconnected microfluidic channels of a microfluidic device wherein one connecting channel extending between the first one of the at least four interconnected microfluidic channels to a second one of the at least four interconnected microfluidic channels, wherein the one connecting channel is a passive channel lacking any fluid actuators; and selectively activating individual asymmetrically located fluid actuators within the at least four interconnected microfluidic channels to selectively activate individual microfluidic channels of the at least four interconnected microfluidic channels between a fluid inputting state, a fluid outputting state and a fluid blocking state, wherein the individual asymmetrically located fluid, actuators are activated at a same frequency and result in different flow rates of the fluid within the interconnected microfluidic channels.

16. The microfluidic device of claim 1 wherein the different flow rates are caused by different relative asymmetric locations of fluid actuators in the set of fluid actuators.

17. The microfluidic device of claim 1 wherein the different flow rates are caused by different cross-sectional areas of microfluidic channels within the set of at least four interconnected microfluidic channels.

18. The microfluidic device of claim 1 wherein the different flow rates are caused by different sizes of fluid actuators in the set of fluid actuators.

* * * * *